United States Patent [19]
Hazenbroek et al.

[11] Patent Number: 6,027,403
[45] Date of Patent: Feb. 22, 2000

[54] CROP REMOVER ASSEMBLY

[75] Inventors: Jacobus E. Hazenbroek, Klaaswaal; Bastiaan Verrijp, Numansdorp; Dirk C. Stooker, AL 's-Gravendeel, all of Netherlands

[73] Assignee: Systemate Holland, B.V., Numansdorp, Netherlands

[21] Appl. No.: 08/954,140

[22] Filed: Oct. 20, 1997

Related U.S. Application Data

[60] Provisional application No. 60/035,995, Jan. 22, 1997.

[30] Foreign Application Priority Data

| Oct. 14, 1996 | [NL] | Netherlands | 1004532 |
| Oct. 18, 1996 | [NL] | Netherlands | 1004312 |
| Nov. 28, 1996 | [NL] | Netherlands | 1004638 |

[51] Int. Cl.$^7$ .................................................. A22C 21/06
[52] U.S. Cl. ............................ 452/117; 452/118; 452/123
[58] Field of Search ................................. 452/117, 118, 452/116, 107, 123

[56] References Cited

U.S. PATENT DOCUMENTS

| 3,886,635 | 6/1975 | Meyn . | |
| 4,184,229 | 1/1980 | Soran | 452/116 |
| 4,516,290 | 5/1985 | Van Mil | 452/118 |
| 4,610,050 | 9/1986 | Tieleman . | |
| 4,677,709 | 7/1987 | Dikon | 452/116 |
| 4,776,063 | 10/1988 | Tieleman . | |
| 4,788,749 | 12/1988 | Hazenbroek et al. . | |
| 4,876,767 | 10/1989 | Harben | 452/123 |
| 4,910,829 | 3/1990 | Simmons | 452/116 |
| 4,918,787 | 4/1990 | Hazenbroek . | |
| 5,041,054 | 8/1991 | van den Nieuwelaar et al. | 452/123 |
| 5,178,578 | 1/1993 | Simmons | 452/117 |
| 5,707,280 | 1/1998 | Tieleman et al. | 452/117 |

*Primary Examiner*—Willis Little
*Attorney, Agent, or Firm*—Thomas, Kayden, Horstemeyer & Risley

[57] ABSTRACT

Device for removing at least the crop of slaughtered poultry, comprising means for holding a carcass of the poultry, a crop probe assembly with a crop probe holder and an elongated crop probe, which is provided with crop engaging means in an end portion, such as a number of teeth/sprockets, means for moving the crop probe up and down between a non-active position to one or more active positions, means for turning the crop probe about its longitudinal axis, in which the crop probe is provided with a nose on the outer end of the end portion, and in which on the side of the holder means facing away from the crop probe the device is provided with a neck breaker with neck breaking means and with means for activating the neck breaker and with means for moving the neck breaker toward the carcass and away from it, said means for moving the crop probe, the activating means and the means for moving the neck breaker being geared to one another such that during activation of the neck breaker the nose of the crop probe is held on a level which is situated just above the breaking plane of the neck of the carcass to be realized by the neck breaker.

17 Claims, 21 Drawing Sheets

CROP REMOVER ASSEMBLY

This application claims the benefit of U.S. Provisional Application Ser. No. 60/035,995, filed Jan. 22, 1997, and claims priority with respect to application Ser. No. 1,004, 314 filed Oct. 18, 1996, in the Netherlands, application Ser. No. 1,004,532 filed Nov. 14, 1996, in the Netherlands, and application Ser. No. 1,004,638 filed Nov. 28, 1996, in the Netherlands.

FIELD OF THE INVENTION

The invention relates to a device and a method for removing the crop of slaughtered poultry. The invention further relates to a crop probe for a suchlike device and method.

BACKGROUND OF THE INVENTION

Devices for removing at least the crop from slaughtered poultry, also known as crop removers or (de)croppers, are known among others from the applicant's firm and from European patent application 0.162.254 and U.S. Pat. No. 5,178,578, for example. A suchlike crop remover is installed downstream from an eviscerating machine. In the crop remover, with the help of a rotating crop probe which passes into the poultry carcass via the vent, the whole crop and the trachea as well as everything else attached to the neck is removed. The crop remover is subsequently removed through the opposite neck opening of the carcass in order to permit delivery of the loosened parts to a tray placed under that and to be cleaned, after which the crop remover can be retracted again to an out-of-operation position.

In slaughter lines, in particular in the so-called eviscerating lines, a number of stations are arranged after the crop remover, such as station where the neck is broken, a station where the inside of the carcass is cleaned and a station where the outside of the carcass is cleaned. Applicant already offers for sale a neck breaker, which breaks the neck and in one embodiment removes it without unnecessarily damaging the skin of the neck and in another embodiment removing the neck together with the skin of the neck. For this reference can be made to the applicant's Dutch patent application 79.04779. In addition, a combination neck breaker/final control machine is part of the applicant's delivery programme, in which not only the neck is broken but also the inside of the carcass is sucked clean With the help of a pipe provided with a slanting end introduced from above, the lungs and other parts not suitable for consumption, which remained behind after evisceration, are removed. In addition, the applicant has an automatic inside-outside washer, in which the outside of the carcasses is cleaned with sprayers, while the inside is washed by means of a water tube with a special mouth piece. Finally, a combined crop remover/inside-outside washer can be mentioned, in which the inside of the carcasses is washed with the help of spray water supplied via the crop probe.

SUMMARY OF THE INVENTION

The object of the invention is to provide a machine, which, in addition to the crop removing function can at least fulfil a neck-breaking function. For this purpose the invention provides a device for removing at least the crop of slaughtered poultry, comprising for removing at least the crop of slaughtered poultry, comprising means for holding a carcass of the poultry, a crop probe assembly with a crop probe holder and an elongated crop probe, which is provided with crop engaging means in an end portion, such as a number of teeth/sprockets, means for moving the crop probe up and down between a non-active position to one or more active positions, means for turning the crop probe about its longitudinal axis, in which the crop probe is provided with a nose on the outer end of the end portion, and in which on the side of the holder means facing away from the crop probe the device is provided with a neck breaker with neck breaking means and with means for activating the neck breaker and with means for moving the neck breaker toward the carcass and away from it, said means for moving the crop probe, the activating means and the means for moving the neck breaker being geared to one another such that during activation of the neck breaker the nose of the crop probe is held on a level which is situated just above the breaking plane of the neck of the carcass to be realized by the neck breaker.

In the device according to the invention neck breaking or shearing takes place almost directly after removing the crop and in doing that use is made of the part which was already used for the crop removal, namely the crop probe. The nose of the crop probe stabilizes the neck region at the location of the desired breaking plane, so that breaking takes place in a more positive fashion. Further special means for stabilizing the neck region can be disregarded, such as those which are known from the above mentioned Dutch patent application 79.04779, for instance.

Preferably the moving means for the crop probe, the activating means for the neck breaker and the moving means for the neck breaker are geared to one another such that directly after breaking the neck the neck breaking means are moved away from the carcass in distal direction in a neck clamping position and the crop probe remains in position. In this case the severed lower portion of the neck vertebrae is forced downwards within the skin of the neck, the nose of the crop probe co-operating to keep the neck in place.

Although the above-mentioned neck breaker of Dutch patent application 79.04799 proved to be working well, there is however a need for a similar device, which is simpler and takes up less space.

Thus it is a further object of the invention to provide this and for this purpose from another aspect, provides a device for breaking the neck of slaughtered poultry which is propelled along a processing path, comprising means for holding the poultry with the neck down, which holding means comprise means for holding the carcass which are arranged on a holding support on one side of the poultry processing path, which support is part of a system of identical supports of identical devices driven in a circulating fashion, the device further comprising a breaker for breaking the neck, which is arranged on a breaker support and means for operating the breaker, in which the breaker support and the operating means for the breaker are located on the same side of the poultry path as the holding support.

In the device according to the invention operating means for the neck breaker do not need to be located on the side of the processing path which is turned away from the supports for the carcasses. As a result of this the taking up of space of a neck breaking device with a plurality of units, for instance shaped like a carousel, can be less. Furthermore the safety is increased in this way because no moving parts which have sharp edges will be present on the outside of the carousel.

The breaker preferably comprises two breaker means which are arranged on the breaker support to be moveable in a relative manner towards and away from one another, in which the breaker means are advantageously arranged in such a way that they are moveable with regard to one another in a direction having a component parallel to the poultry path, preferably in a vertical plane which is parallel to the poultry path at that location. In this way the structure of the breaker can be kept simple and the breaker means in their non-active position can form a radially inwardly accessible receiving space for the neck of the carcass.

In addition it is preferable that the breaker means are formed on rotatably bearing-mounted breaker members, the rotation axis being preferably perpendicular to the poultry path. In this way the space present next to the carcass, in the direction of the poultry path, is made use of for the movement of the breaker. As a result of this the taking up of space of the device according to the invention is further minimized.

According to a development of the device according the invention the operating means comprise interengaging gear wheels provided on each of the breaker members and an operating bar connected to at least one of the gear wheels in a rotation-fixed manner and extending radially from the rotation axis and provided at one end with a follower for following a cam curve or the like. In principle operating one of the breaker members causes the movement of both breaker members and directly and indirectly respectively.

Preferably at least one of the breaker members is provided with means for detaining the carcass neck in a direction transverse to the poultry path. Such a provision is advantageous if the breaker in the device according to the invention is located in a unit in which also a crop remover is incorporated, which—as is usual—is provided with a crop probe, which from the top, via an anal opening is inserted in the inside of the carcass. After such a crop probe has loosened the crop in the inside of the carcass by rotation the crop probe is moved further downward, in which case said probe has been moved along the neck vertebrae but still within the neck skin to the outside and below the neck of the carcass. The crop probe is moved downward according to a substantially vertical line, because of which the neck will tend to move off the holder. Because of the aforementioned provision according to the invention it is ensured in that case that the neck vertebrae are correctly positioned with regard to the breaker members during breaking the neck subsequent to the removal of the crop.

Preferably the breaker members are at least almost semicircular—cylindrical. The rotation axis then preferably at least almost converges with the centre point of the circle of the cross section of those breaker members. It is advantageous if the breaker members are arranged for moving the breaker means towards one another with a downward component. As a result of this a neck vertebrae ejecting effect is effected as well during breaking, because of which a separation is made between body and neck without damaging the neck skin.

According to another aspect the invention also relates to a holder for the carcass of slaughtered poultry during a crop removing operation, which can also be used in cooperation with the breaking device described above. As already indicated before a crop probe is usually made use of when removing crops, which crop probe is moved downward and outside the carcass. After rinsing the crop probe it is moved upward again via the neck through the carcass to a position above the carcass. In order to prevent the carcass from moving with the crop probe during the upward movement of said crop probe, detaining means are usually made use of which engage the axillary regions of the wings. Although in this way the carcass is secured satisfactorily during pulling the crop probe up, the problem occurs that—because said detaining means engage at a place which is located on the side, outside the actual hinge point of the wing joints—the wings during the upward movement of the crop probe through the carcass to the outside are rotated and can then be damaged, even be torn off.

It is an object of the invention to provide a solution for this, for which purpose it is provided that the carcass holder furthermore comprises means for detaining the wings of the carcass against downward displacement. As a result of this the wings are, as it were, detained in two vertical directions, because of which a moment exerted on it as a result of pulling up the crop probe is counteracted.

Preferably the means for detaining the wings of the carcass against downward displacement are provided with second detaining faces for engaging the axillary regions of the wings of the carcass. These second detaining faces are preferably located at a distance from the vertical centre line of the carcass to be held, which is larger that the distance from the first detaining faces to that centre line. In this way an optimal interplay of forces for the wings is effected during pulling up the crop probe, wherein a moment results in detaining the wings from opening.

The first detaining faces are preferably formed on L-shaped substantially vertically extending supports, in which the vertical lea of the L extends along the back of the carcass. Preferably these L-shaped supports are provided with third detaining faces for detaining the carcass in a lateral direction.

In an advantageous manner the device according to the invention can combine even more of the functions described in the introduction, to which purpose, according to the invention, from still another aspect, the crop probe is provided with means for outwardly spraying cleansing liquid and in which the device is further provided with means for feeding the cleansing liquid to the spraying means. The crop probe can then be used to wash the inside of the carcass during the returning, rising and rotating movement through the carcass.

The spraying means are in addition preferably arranged in a lower portion of the crow probe, for instance in or near the end portion. If there is question of a cut-away end portion the spraying means can be situated therein and arranged with a spray opening facing the outside. Moreover, the washing fluid can easily escape via the neck opening. Alternatively, the spraying means can be located just above the end portion and preferably comprise a circumferential series of nozzles which are preferably angled in the direction of rotation.

According to a following aspect of the invention the crop remover can be combined with a so-called final control machine. In this case the crop probe assembly, preferably the crop probe holder is provided with means for the suction of air from the vicinity of the crop probe assembly and in which the device is further provided with means for discharging the sucked-in air and the organ remains carried by it. The suction means preferably contain one or more suction mouths, which are spaced at a distance from the end portion which is larger than the distance between the end on the neck and the crop of the carcass to be processed. This new combined device forms a further simplification, in which downward and upward movement of the crop bore assembly through the carcass, necessary for eviscerating the crop, is applied for the purpose of final control, in which lung (remains) and other organ remains are removed.

The invention further provides a crop probe and a crop probe assembly as described in the accompanying claims which is suitable for one or more of the described devices according to the invention.

The invention furthermore provides an assembly for removing at least the crop of slaughtered poultry and breaking and removing the neck thereof, comprising a conveyor for the poultry carcasses in accordance with the slaughter line, means for moving along the devices according to the invention with the carcasses, in which, downstream from the place of the activating means of the neck breaker, along the line, stationary neck vertebrae ejecting means are arranged. These neck vertebrae ejecting means, which are preferably formed on either side of the neck, by guides which extend in slaughter path direction and which incline downwards in the transport direction, ensure an automatic further downward ejection of the broken-off neck vertebrae from skin of the neck as an alternative to the neck vertebrae ejecting use of the transversely extending breaker members discussed above.

At the location of the neck vertebrae ejecting means the assembly according to the invention preferably further contains external spraying means for cleansing the carcass with a cleaning liquid.

The method for removing at least the crop of slaughtered poultry, as is provided by means of the invention, is among other things described in the accompanying claims, the text of which is considered inserted here.

BRIEF DESCRIPTION OF THE DRAWINGS

The invention will now be elucidated on the basis of an illustrative embodiments of the assemblies according to the invention which shown in the accompanying drawings, in which.

DETAILED DESCRIPTION

Figure 1:
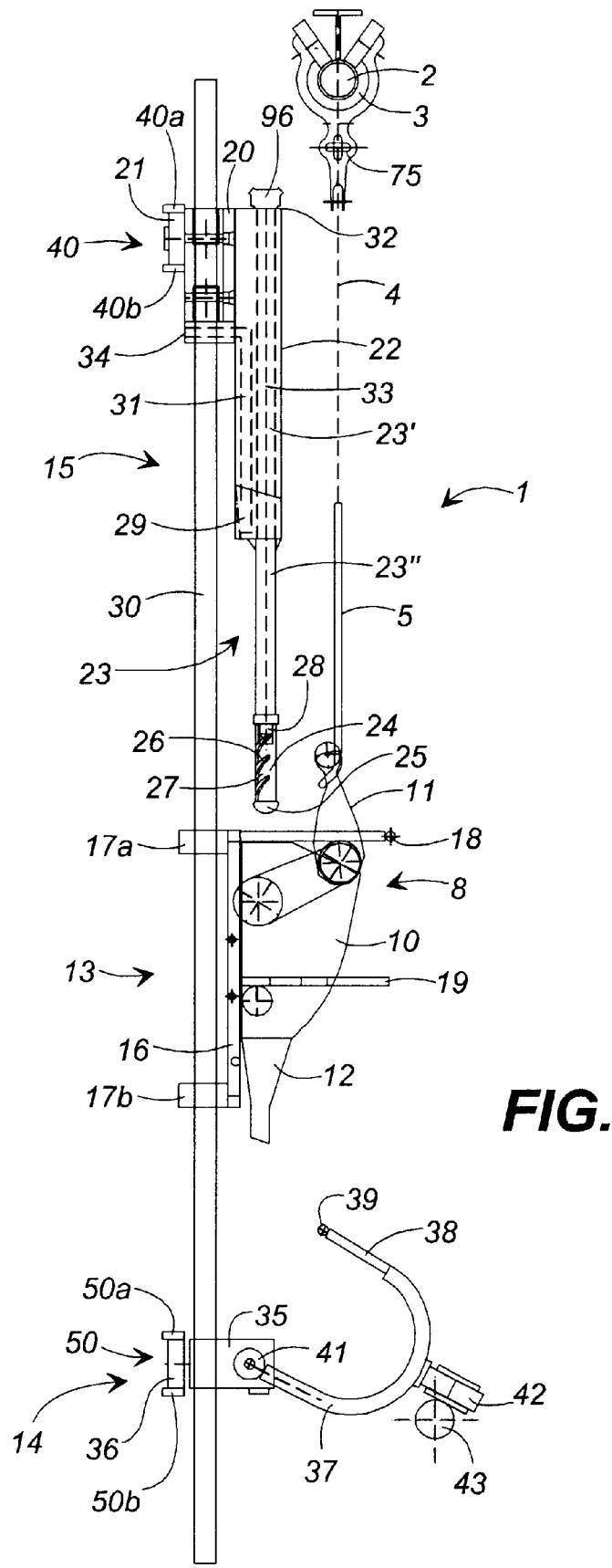
FIG. 1 shows a vertical view of an illustrative embodiment of an assembly according to the invention, comprising a unit which is built up of a crop probe, a carcass holder and a first embodiment of a neck breaker.

The assembly shown in FIG. 1 comprises a unit 1, which is built up of a crop probe 15, a carcass holder 13 and a neck breaker 14, which are arranged on a pair of vertical rods 30 (only one of which is shown). These rods 30 are mounted such that they are slidable or movable at the top and at the bottom on stationary tracks and are propelled by a drum, for instance. It will be understood that in a slaughter line a series ot units 1 will be arranged one behind the other as seen in the processing direction, so as to form a circulating, for example oval-shaped series, which, for the course at which the desired processing has to take place, coincides with the path of a conveyor, in this case an overhead conveyor with upper guide 2, on which trolleys 3 are pulled forward with the help of chain 75. The trolleys 3 are provided with an overhead wire 4, in which a leg hook 5 is attached. A carcass 8 of a slaughtered bird is hung by the legs 11 in the lower end of the leg hook 5 and is kept in position by means of a holder 13, which is securely attached to the rods 30 by means of attachments 17a and 17b and which is provided with a back plate 16, from where the axillary holding rods 19 and the leg bracket 18 extend. With its back the carcass 8 abuts the back plate 16 and extends downward with the neck region 12.

The neck breaker 14 is located underneath the holder 13 and comprises a block 35, which is upwardly and downwardly moveable along the guiding rods 30 and which on the other side of the guiding rods 30 is provided with a roll 36, which moves in a cam or curve track 50 of which the upper boundary 50a and the lower boundary 50b are shown. On the side which is turned towards the slaughter line block 35 is provided with a bracket 37, which at the location of 41 is hinged connected to block 35. On the outside the bracket 37 is provided with a cam 42, which engages a guiding rod 43 which extends in the direction of the slaughter line. On the other end the U-shaped bracket 37 is provided with a breaker member 38, of which the breaker end 39 is shaped to be able to separate neck vertebrae by breaking action.

Above the holder 13 a crop probe assembly 15 is located, which comprises a crop probe holder 20, which on its side which is turned away from the slaughter line is provided with a roll 21, which is guided in curve track 40 of which the upper boundary 40a and the lower boundary 14b are shown. On the side turned towards the slaughter line the crop probe holder 20 is provided with downwardly extending holder member 22, in which the upper portion 23' of a crop probe 23 is accommodated against axial sliding but still rotatably. The upper end of the upper portion 23' of the crop probe 23 is provided with a cone-shaped drive gear wheel 96. The lower portion 23" of the crop probe has at its lower end an end portion 24 which acts as a crop remover, which end portion itself ends in a closed, convex nose 25. The end portion 24 comprises two plates, which are arranged along the circumference and which define longitudinal gaps 26 between them, and furthermore are provided with teeth 27 which extend downwards in a slanting way and in circumferential direction. Located at the upper end of the end portion 24 is a sprayer 28 which is directed to the outside, and which is supplied with spraying water by means of one or more lines 33 and fixed inlet 32a, on which a further supply line (not shown) can be connected. Between line 33 and the inlet 32a rotation-seal is provided. It is noted that the end portion alternatively may comprise a closed cylindrical plate, which is provided with radial/tangential extending engaging lips or teeth, like for instance shown in U.S. Pat. No. 5,178,578. The arrangement of the sprayer(s) is then adapted, so that the nozzles cover the area outside the cylindrical plate. Just above the lower end, in which the crop probe 23 is inserted, the holder member 22 is provided with vacuum lines 31, which can be connected to a vacuum source via a connection 34 in the holder block 20 and a further vacuum line (not shown) to be connected to it. The vacuum lines 31 are provided with one or several suction mouths 29, through which air from the outside can be sucked in.

Below, on the basis of FIGS. 2A–2I the operation of the unit 1 shown in FIG. 1 will be discussed, including special further parts in the embodiment of the assembly according to the invention which are arranged along the slaughter line. It will be understood that in FIGS. 2A–2I subsequent stages in the treatment are shown, in which the unit 1 with guiding rods 30 is simultaneously moved with the trolley 3. As seen on the drawing left next to the guiding rods 30 cure tracks are arranged in a stationary way, with the curve tracks shaped in such a way with curvings in the vertical plane, that the movements to be discussed can be enforced on the breaker unit 14 and on the crop probe 15.

Figure 2A:
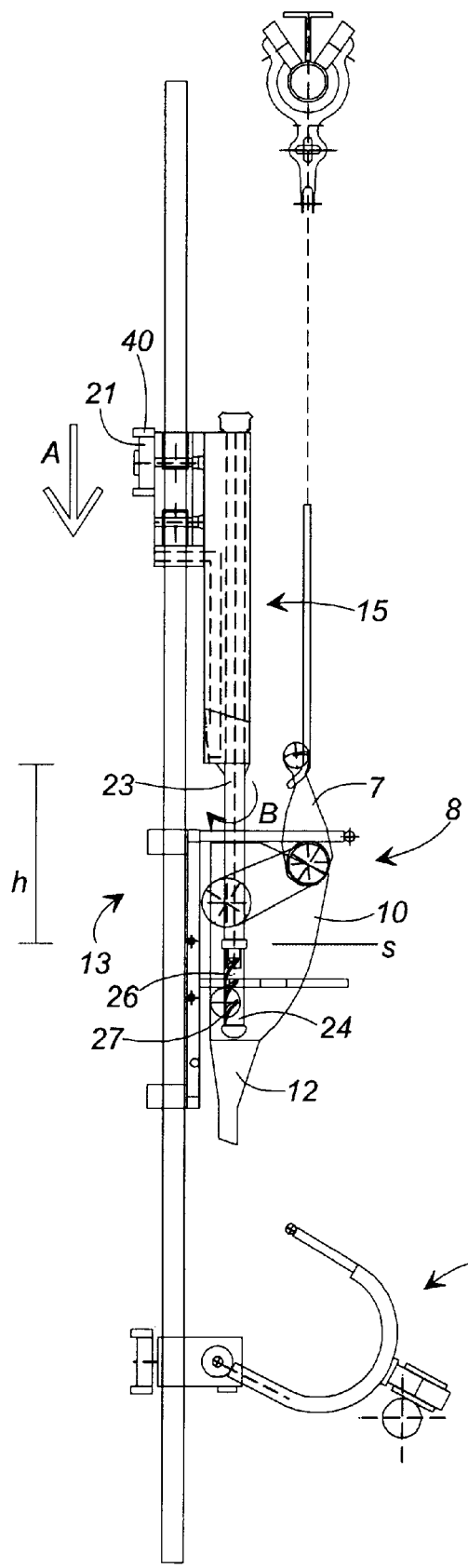
FIGS. 2A–2I show views of successive phases of the assembly show in FIG. 1.

In FIG. 2A a curve track 40 causes the crop probe holder 15 to move downwards (A), the crop probe 23 to pass inside the carcass 8 via its vent which has been enlarged by a vent cutter and eventually to reach the location of the crop with end portion 24. During this downward movement the crop probe 23 can be rotated in the direction B. In the working position of the end portion 24 as shown in FIG. 2A, the crop probe 23 is rotated in the direction B, so that the end portion 24 is revolved, in which the teeth 27 will tear off the organs present in that region from the body 10 of the carcass 8, in a manner in itself known.

Figure 2B:
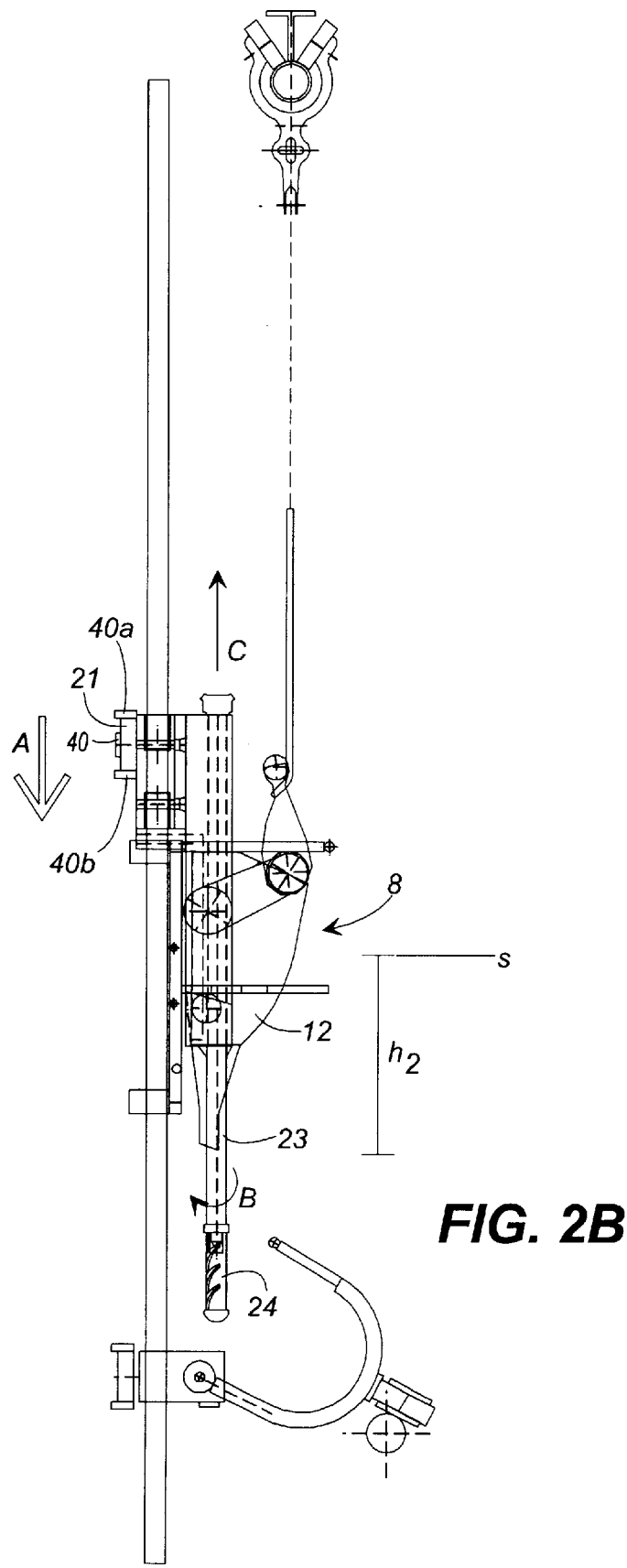
Figure 2C:
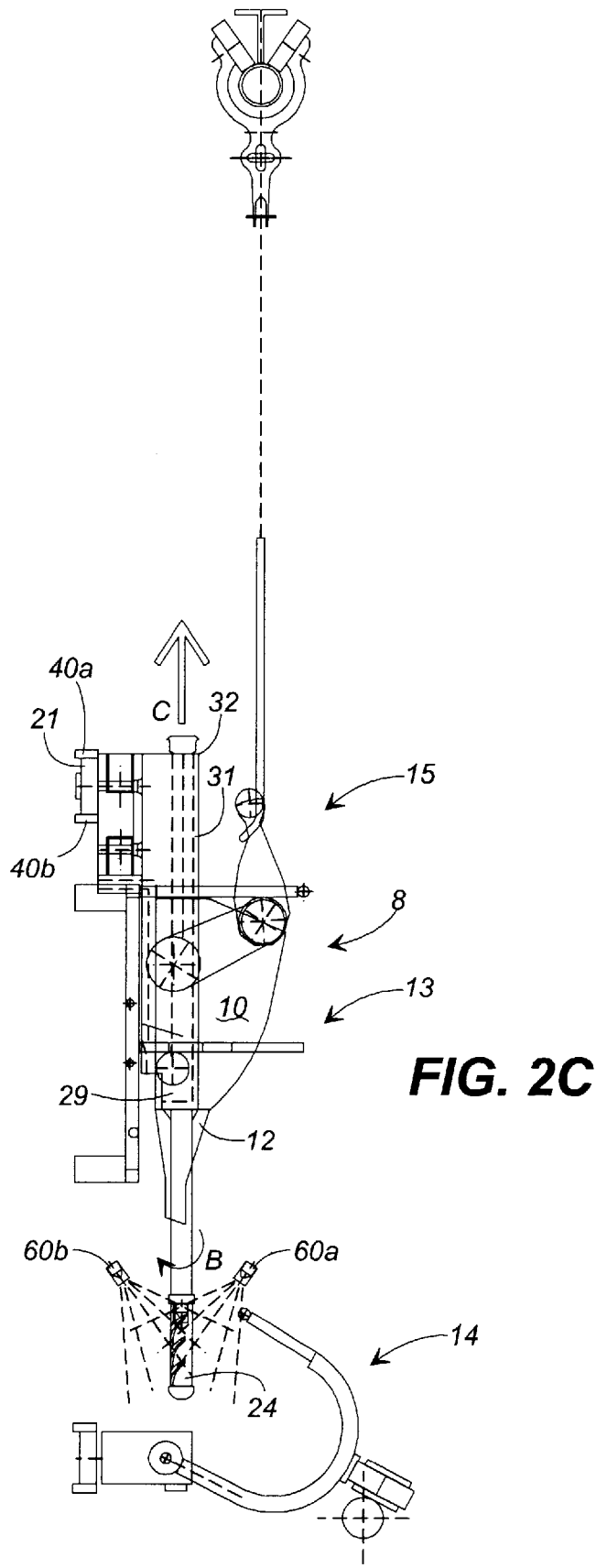

Curve track 40 subsequently causes a further downward movement in the direction A of the crop probe holder 15, so that the end portion 24 moves to the outside through the neck 12 (FIG. 2B). This movement is carried out to the extend that the lower end of the holder member 22 and the suction port 29 are located at the level of the operation area of the teeth 26 (FIG. 2C). The vacuum means are then activated, so that a suction action occurs at the location of the suction inlet 29. As a result of this the remnants of the torn off organs are removed, which is further enhanced by a suitable, for instance an undulatory design of the curve track 40, so that the crop probe holder 15 and hence the suction inlet 29 are moved up and down several times during suction.

Because the suction port 29 is located at a distance $h_1$ from the end portion 24, which is larger than the distance $h_2$ between the upper end crop (S) and lower end of the skin of the neck, the end portion 24 of the crop probe 15 can be sprayed at the same time with the aid of the stationary sprayer 60a and 60b shown in FIG. 2C in order to remove clinging bored out material from that end portion. In this way amongst others contamination of the carcass is prevented.

Figure 2D:
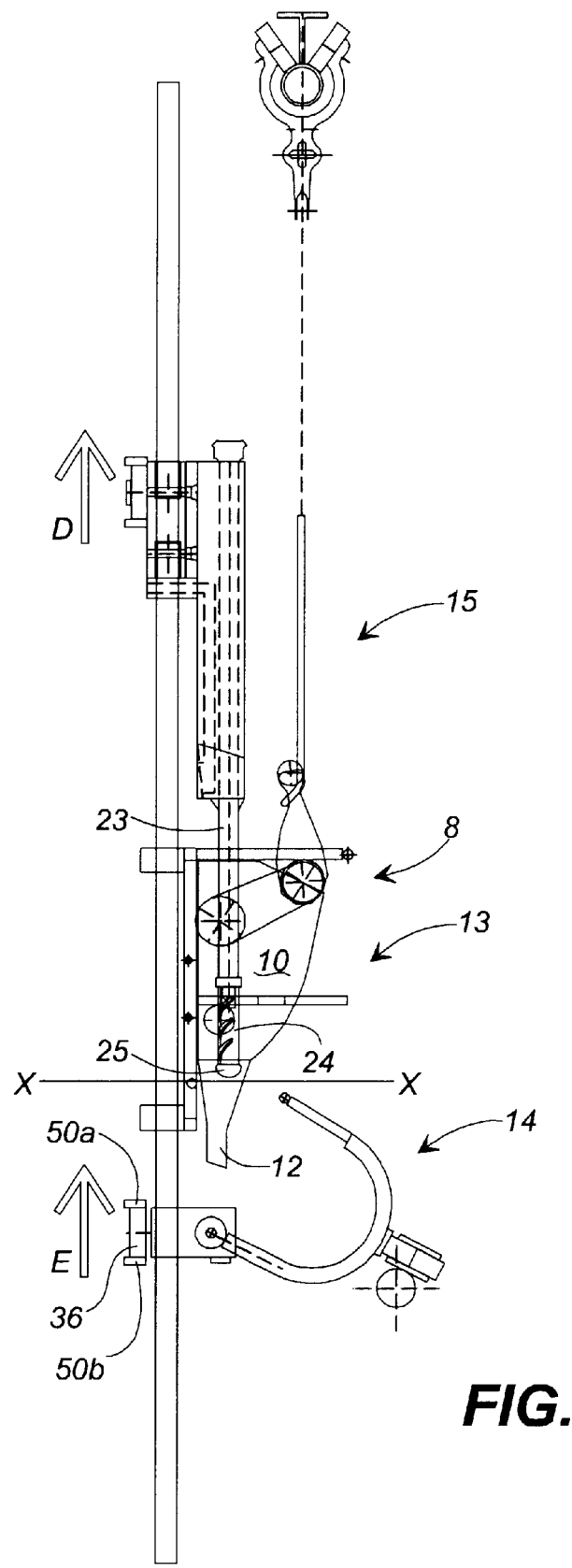

This retracting movement is illustrated in FIG. 2D, in which the curve or cam track 40 is shaped in such a manner that the crop probe holder 15 moves upwards in the direction D. At the same time the neck breaker 14 is also moved upwards in the direction E by suitable design of the curve track 50. The movement of crop probe 15 in the direction D takes place until the nose end 25 of the end portion 24 is located just above the desired breaking plane x—x of the neck 12. Likewise breaker 14 is moved upwards to such an extend in the direction E, that when activating the breaker the break end 39 can be swayed in the plane x—x.

Figure 2E:
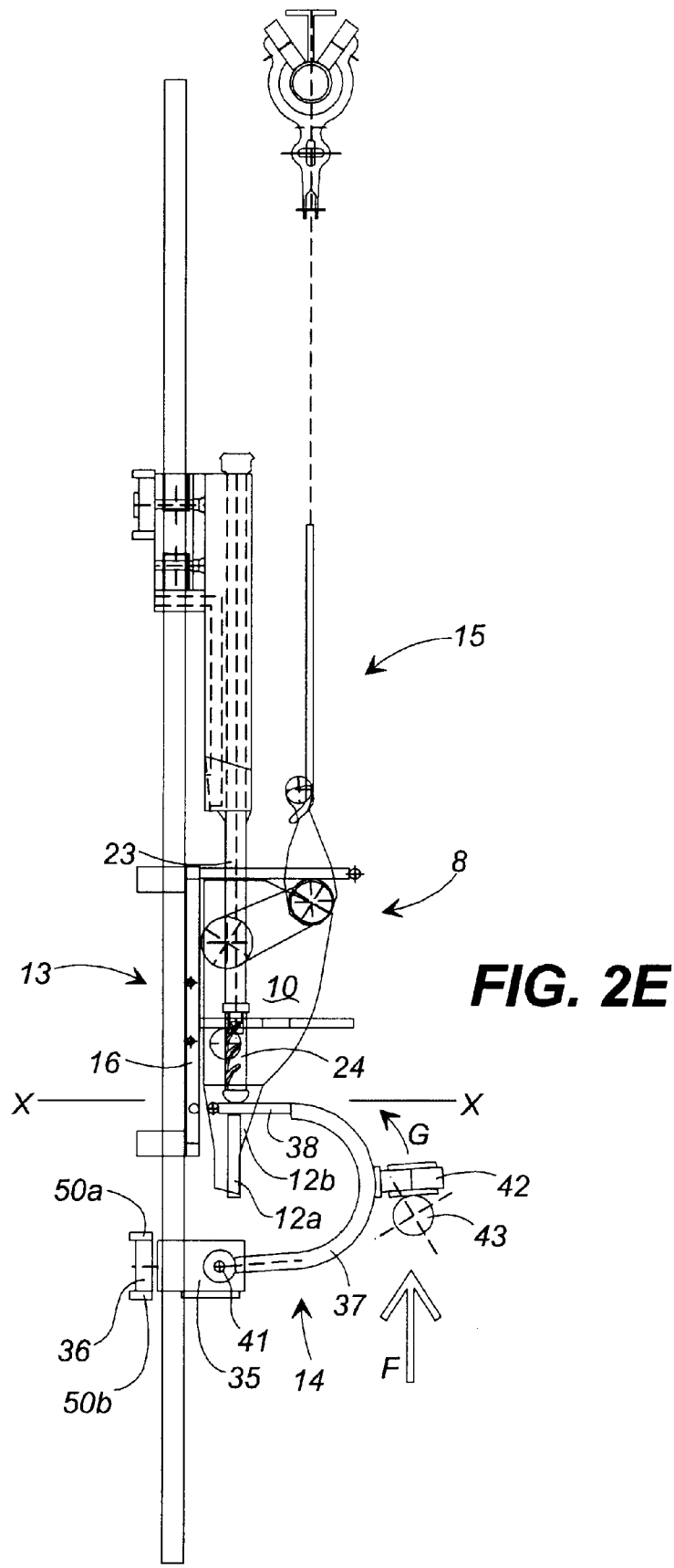
Figure 2F:
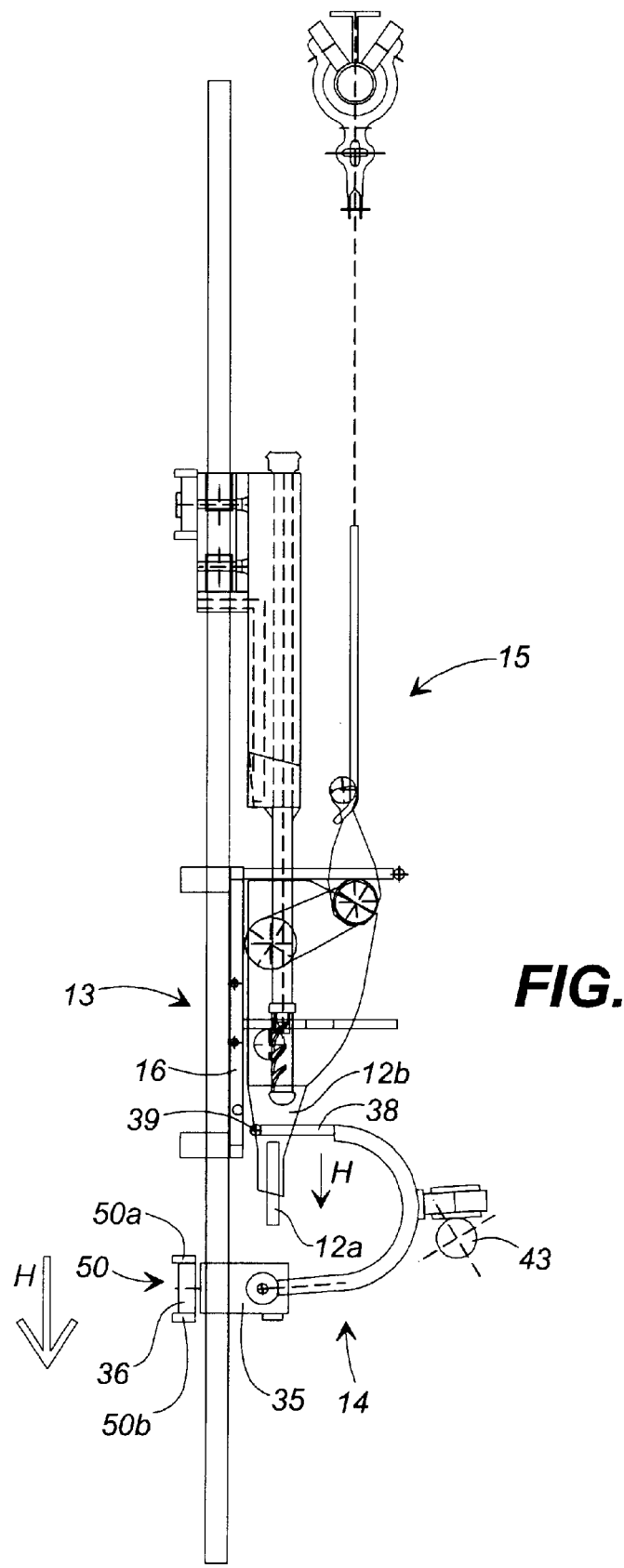

Subsequently, as shown in FIG. 2E, the breaker 14 is operated, which takes place because the guide 43 is shaped in such a way that the cam 42 is forced upwards in the direction F, so that the bracket 37 as seen in the drawing is swayed to the left in a direction G. Because of suitable design of the guide 43 it is achieved that this happens with great speed and force, so that, after the break end 39 has broken the neck vertebrae in plane x—x, in which back plate 16 serves as abutment, a series of dislodged neck vertebrae 12a are situated below the break portion 38, surrounded by neck skin 12b. During breaking the nose 25, because of its position near the plane x—x, causes stabilization of the neck vertebrae in the area near the breaking plane, so that breaking can take place in a reliable way.

The presence of the nose 25 in the neck region is further made use of when forcing the series of separated neck vertebrae 12a somewhat downwards within the skin of the neck 12b.

The (small) downward movement in the direction H is caused by suitable design of the curve track 50, in which the guide 43 keeps the cam 42 in the same orientation as during breaking.

Figure 2G:
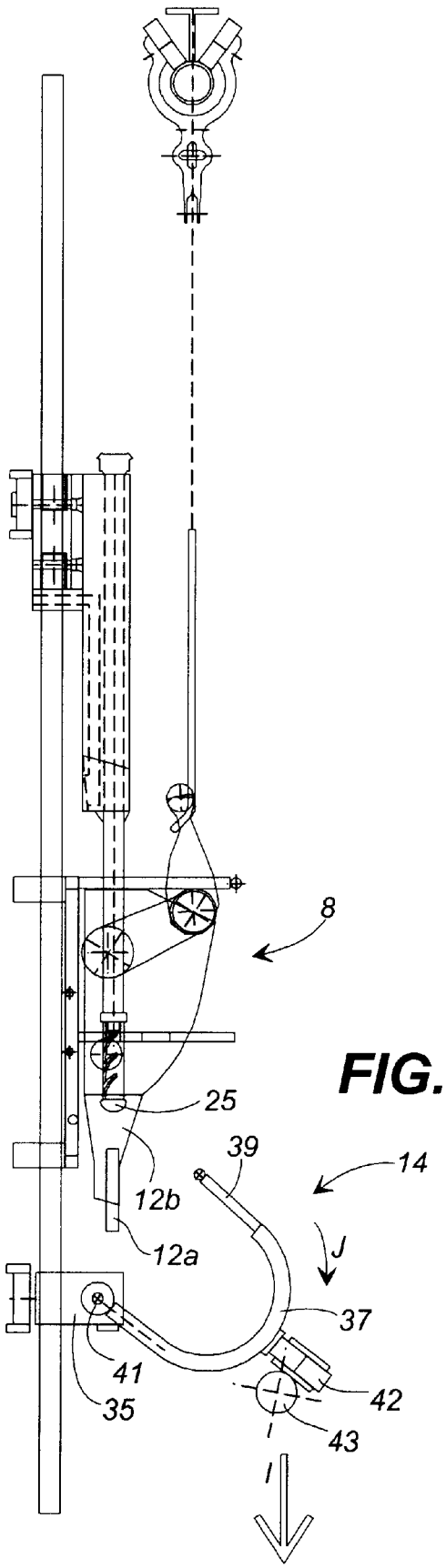
Figure 2H:
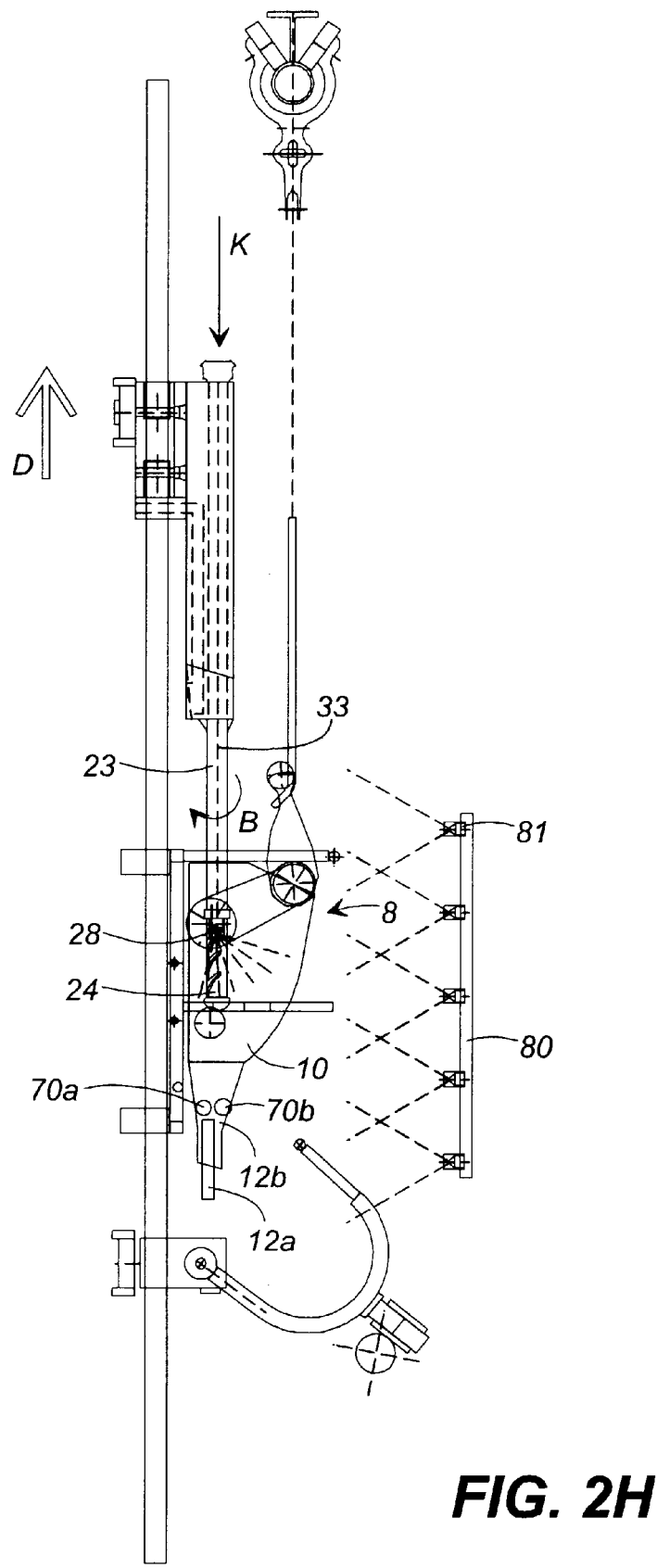
Figure 2I:
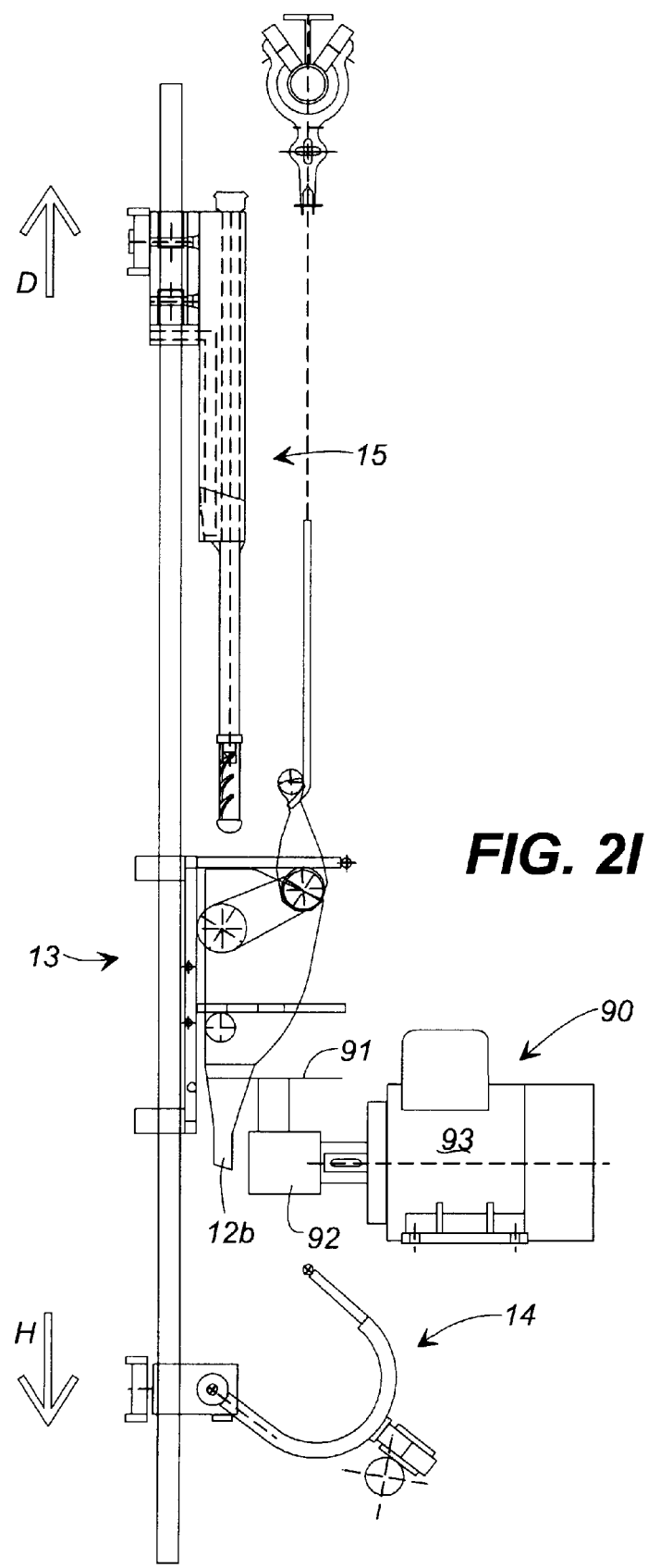

Subsequently the guide 43 curves downwards A little, as shown in FIG. 2G, so that the cam 42 moves downwards in the direction I and the bracket 37 carries out a swaying movement in the direction J, in order to sway the breaker 14 away from the carcass 8.

At the same time or a little later the crop probe 15 is moved upwards again a little by the curve track 40 in the direction D, until the end portion 24 of the crop probe 15 is located in the inner cavity of the body 10 of the carcass 8. From this inner cavity the viscera were removed earlier with the aid of an eviscerator which will not be further discussed here. A number of actions can then be carried out simultaneously. The first action to be discussed is that with the aid of stationary guiding rods 70a and 70b the skin of the neck 12b is engaged and clamped in between them, with continuous movement in conveyance direction. Because of squeezing together of the neck region the dislodged neck vertebrae 12a are pushed further downwards. For this purpose the guides 70a and 70b are designed sloping downwards in the conveyance direction, so that the neck vertebrae series 12a are forced further and further downwards and eventually fall out of the skin of the neck 12b.

The next action which can be carried out is spraying the carcass 8 for cleansing it with the aid of a stationary spray frame 80, which is provided with sprayers 81. The sprayer 28 can also be activated in this operation for an accelerated cleansing.

Special is the action carried out with the aid of sprayer 28, with the aid of which the inside of the body 10 of the carcass is namely sprayed clean. The spraying liquid can drain away downwards, through the neck 12, which is stimulated it the neck vertebrae series 12a are already removed. The sprayer 28 is supplied with the liquid in the direction K, via line 33 and via connection 34. During spraying the crop probe 23 will be rotated again in the direction B in order to wash the entire inner circumference of the inside of the carcass 8 in a good manner. During spraying with the aid of the sprayer 28 the crop probe holder 15 can be propelled at a low pace in the direction D, so that the entire inner surface of the carcass 8 can be reached by the sprayer 28.

Finally the unit 1 reaches the location where knife unit 90 is situated. This knife unit 90 has a motor 93, a converter 92 and a circular knife 91, with the aid of which the skin of the neck is cut off, The breaker 14 can be used in keeping the neck skin taut to some extent. The crop probe assembly 15 has then been moved completely out of the carcass 8 in the direction D, whereas the breaker 14 is moved further downwards in the direction H to an exit position.

After the track, along which the guides 30 are moved, and the track of the overhead conveyor 2 diverge and the carcasses 8 have come loose from the holders 13, the units 1 are led back along any track in order to gather with the overhead conveyor 2 at an upstream location to start a new cycle.

With the assembly according to the invention carcasses are obtained which to a large extend are free of contamination and remains. The assembly unites a crop remover, a breaker, a final control unit, an inside-outside washer and a cutter for skin of the neck, so that one machine will suffice after the eviscerator.

Figure 3A:
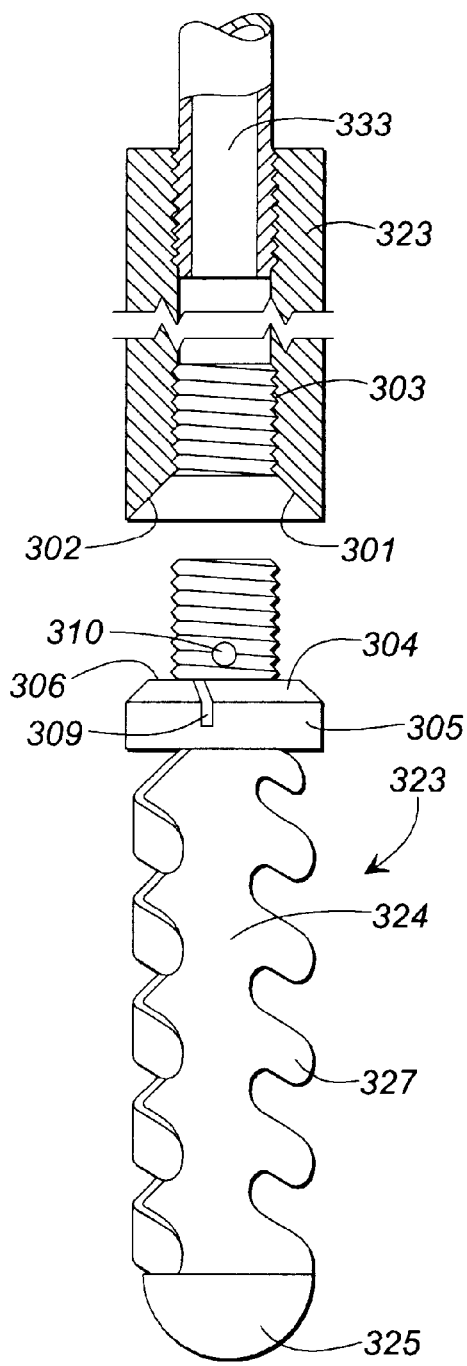
FIGS. 3A–3D show various views on the parts of an alternative embodiment of the rotary crop probe.
Figure 3B:
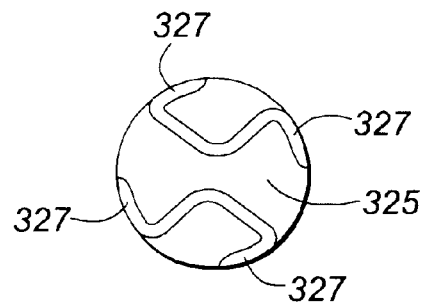
Figure 3C:
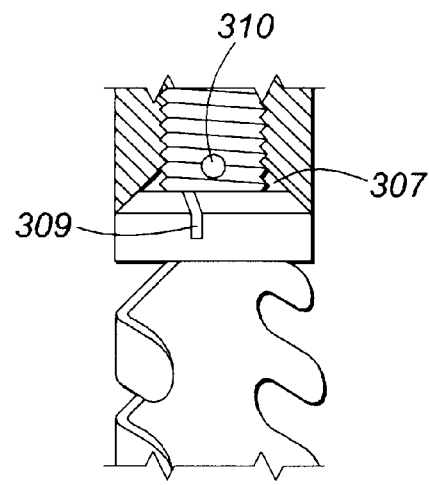

Connector tube 323' (FIG. 3A) has a cylindrical exterior surface and an interior longitudinal passage 333 extending therethrough. The bottom annular surface of connector tube is beveled so as to form circular outer bottom edge, with the sloped annular surface 301 intersecting annular edge 302 and the threaded portion 303 of passage 333. When connector tube 323 is threaded onto end portion 324 (FIG. 3C), circular outer bottom edge 302 of the connector tube engages annular beveled shoulder 304 of the collar 305 of the rotary probe, while the sloped annular surface 301 extends upwardly over upper flat surface 306, forming an annular passage 307 about the lower threaded shank 308, which communicates with the passages 310 of the threaded shank 308 and the radial passages 309 of the collar 305. Therefore, when liquid emerges from longitudinal bore 311 of threaded shank 308 through the passages 310, the liquid will enter an annular plenum chamber 307 that communicates directly with spray nozzles 309 at the annular beveled shoulder 304 of the collar, so that the liquid passes out through the spray nozzles 309, generally outwardly from the probe.

Figure 3D:
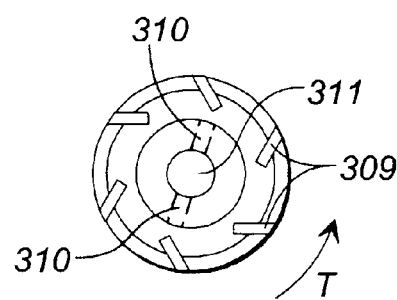

It will be noted that the spray nozzles 309, as illustrated in FIG. 3D, are angled in the direction of rotation T, so that the spray of liquid is propelled in directions that extend between a radial and a tangential direction with respect to the rotary probe.

In the units 1 modifications may be made. Reference is made to FIGS. 4–8, in which the holder and the breaker are modified for further improved operation of the assembly.

Figure 4:
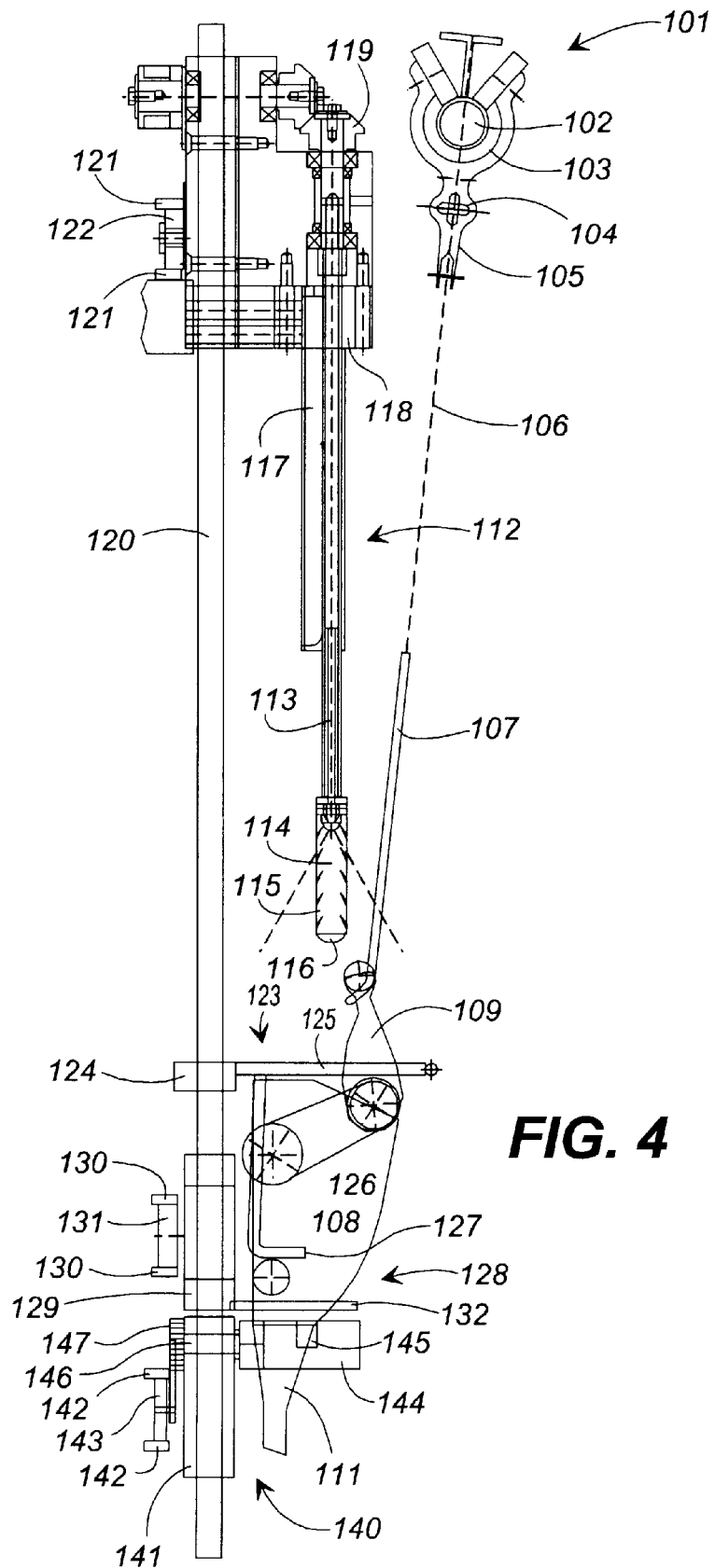
FIG. 4 shows a vertical view of the illustrative embodiment of the device according tot the invention, seen the direction of the track the poultry has to make during the processing, in which a crop probe is shown as well.
Figure 5:
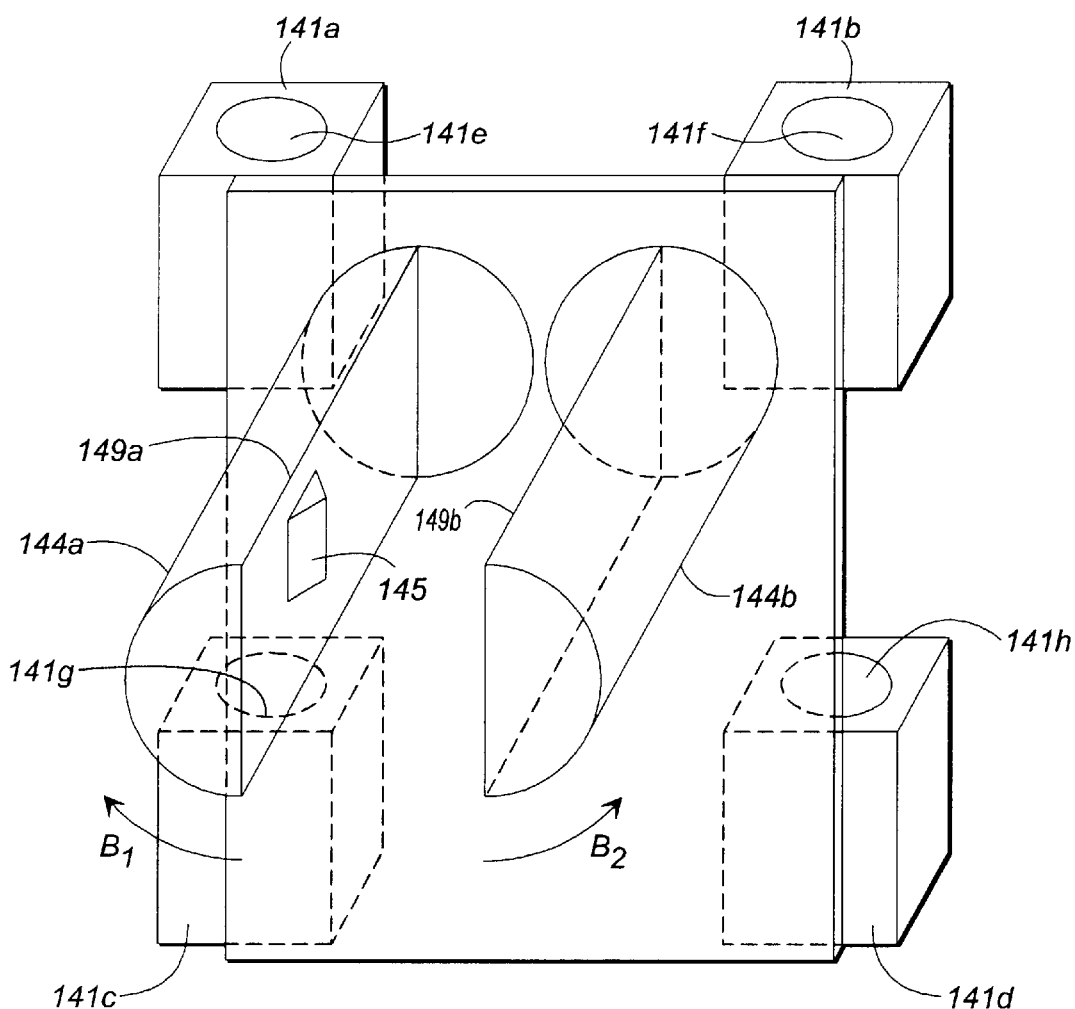
FIG. 5 shows a perspective view of the illustrative embodiment of the neck breaker according to the invention.

In FIG. 4 an overhead conveyor 101 is shown, with a rail 102, on which trolleys 103 are propelled, for which purpose the trolleys 103 are connected to one another and to propelling means (not shown) by means of a drive chain 104. At the lower end 105 the trolleys 103 are provided with a depending intermediate rod 106, on which a leg hook 107 is attached. At its lower end the leg hook 107 carries the legs 109 of a carcass 108 of a chicken. This chicken hangs with its neck 111 downwards.

At the left side of the conveyor 101, as seen in the drawing, usually the inner side of the track, a unit 112 is located, which is a part of a series of similar units arranged on a circulating frame, for instance in the shape of an oval carousel. The driving means for such a carousel are not shown but will be sufficiently known to the expert. The unit 112 comprises a crop probe 113, which in its end 114 is provided with teeth 115 and a rounded lower end 116. The crop probe 113 is accommodated in a crop probe holder 117 which depends from the holder block 118. The crop probe 113 projects upwards through the crop probe holder 117 and the holder block 118 and is provided there with a cone-shaped drive gear wheel 119, which is driven to let the crop probe 113 rotate about its centre line. If the lower end 114 of the crop probe 113 is located at the level of the crop of the carcass 108, the teeth 115 will loosen the crop.

The unit 112 further comprises two rods 120 (of which only one is shown), along which the holder block 118 can be moved up and down. For this up and down movement the holder block le is provided with a cam roll 122, which is situated between the upper and lower boundary of a curve or cam track 121. This curve track extends according to the path which is followed by the units 112, in which a downward or upward movement of the crop probe is effected by the descending or rising courses of the curve track 121.

Below the crop probe 113 a carcass holder 123 is situated, which with the aid of a fixing block 124 is fixedly attached to the rods 120. From the fixing block 124 a leg bracket 125 protrudes in an outward direction (to the right as seen in the drawing), which in a manner known per se engages between the legs 109. This leg bracket is shaped as a U-shaped bracket, of which the base is turned to the outside and is rounded. From ear of the legs of the leg bracket 125 an L-shaped axillary support 126 extends in downward direction, of which the foot 127 is horizontally outwardly directed. These L-shaped axillary supports 126 are rigidly fixed to the leg bracket 125 and with their downwardly directed surfaces 150a, 150b (see FIG. 7A) do not only offer resistance against an upwardly movement of the axils of the wings 110, but they also offer a lateral support 153a, 153b (see FIG. 7A) against lateral displacement (those directions of conveyance of the carcass) of the carcass. An extra abutment pin 160 is attached to the left axillary support 126 (see FIG. 7A), with which an additional abutment against rotation of the carcass 108 during removing the crop—as a result of the rotation of the crop probe—is provided.

Figure 7A:
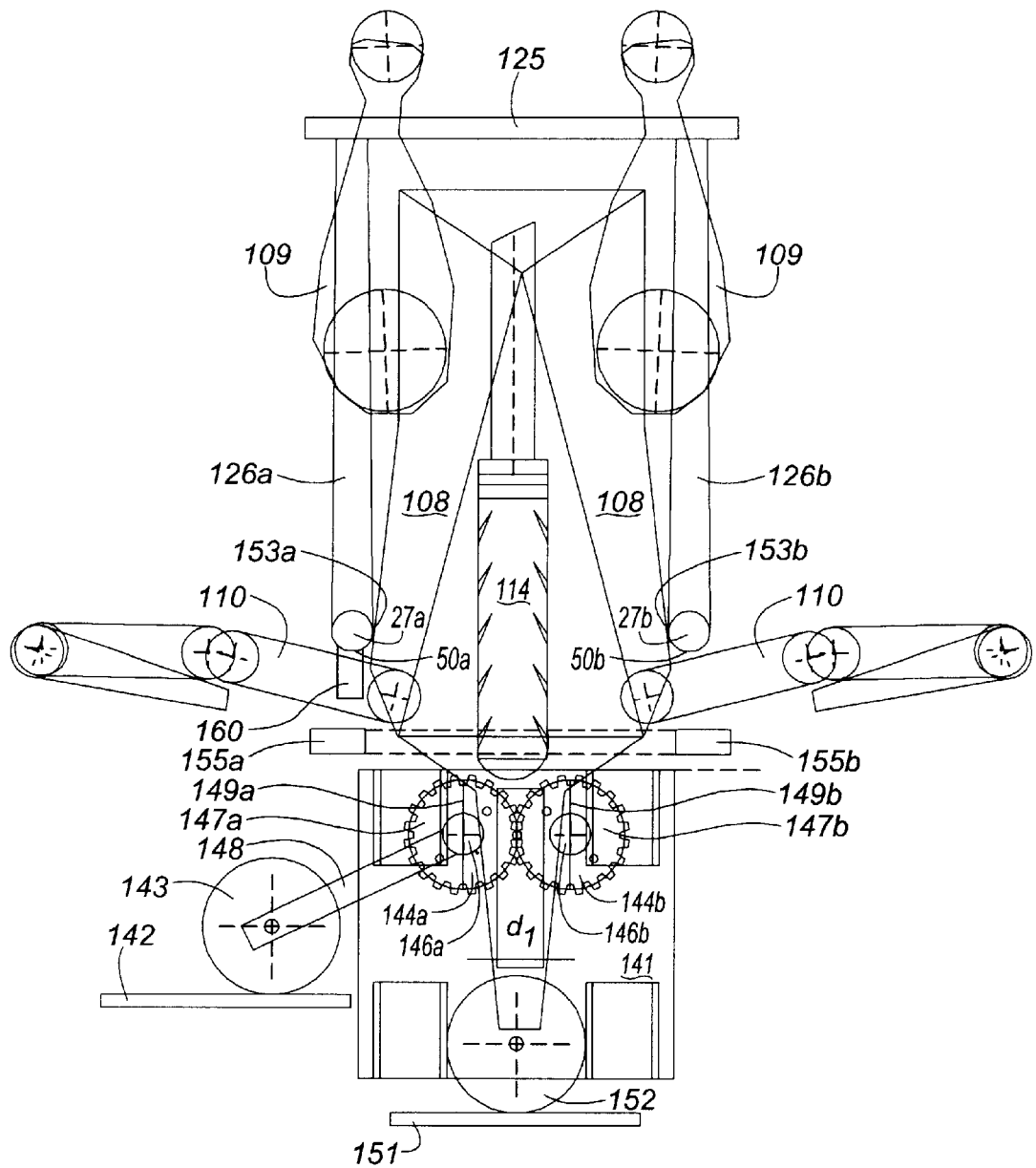
FIGS. 7A–7F show schematic front views in consecutive stages of the device shown in FIG. 4.

Beneath the U-shaped shoulder support 132 there is an alternative breaker 140 according to the invention, with a holder 141, which is provided with two pairs of blocks 141a–d with passages 141e–h for the rods 120 and with two breaker members 144 extending in outward direction (to the right as seen in the drawing in FIG. 4), which between them, in the non-active position, define a passage space for the neck 111 of the carcass 108. The breaker members 144 form a whole with the rotation shafts 146 bearing mounted in holder 141, which form a whole with gear wheels 147a, b at the inner end (seen on the left in the drawing). As can be seen in FIG. 7A the gear wheel 147a or the rotation shaft 146a is rigidly connected to lever arm 148, at the free end of which a roll 143 is attached, which is arranged so as to follow a curve track 142. At least one of the breaker members 144 is provided with a stop 145 extending into the passage defined by the breaker members 144 to check the neck 111 if it has the tendency to rotate simultaneously and outwardly during the rotation of the crop probe.

Figure 6A:
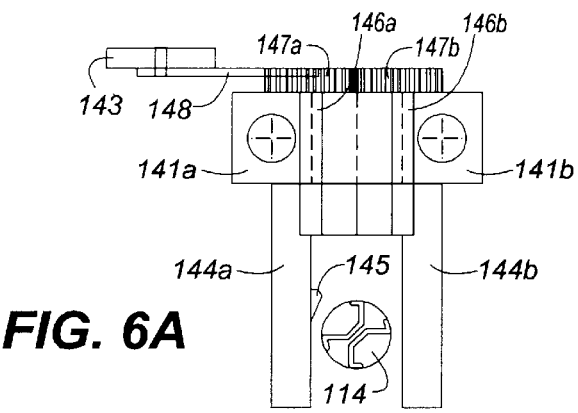
FIGS. 6A–6D show two schematic views from above and two accompanying rear views respectively, in non-active and active position respectively of the neck breaker of FIG. 5.
Figure 6B:
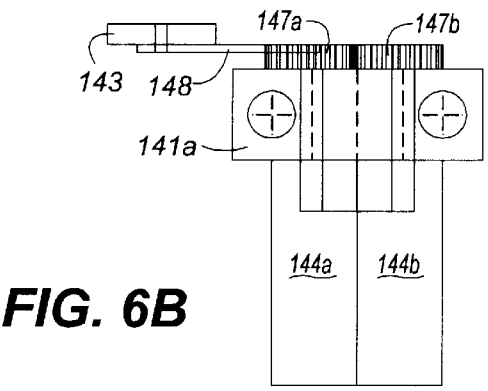
Figure 6C:
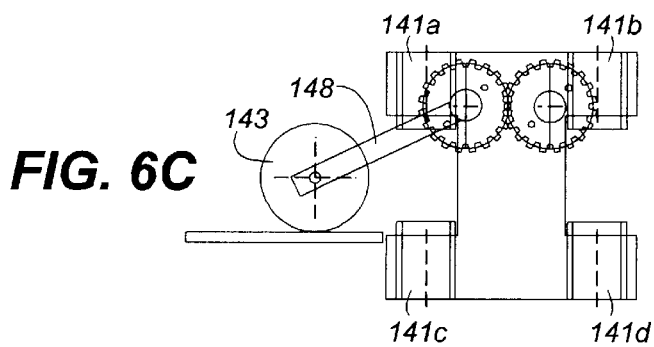
Figure 6D:
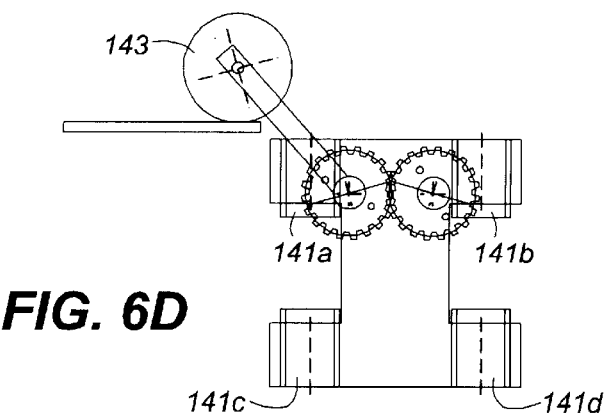

In the FIGS. 5 and 6A–6D the operation of the breaker 140 as such is explained. The breaker members 144a, 144b are formed by semi-circular cylindrical bodies, the upper edges 149a, 149b of which form breaking edges. As is shown in FIG. 6A the crop probe 114 can move between the breaker members 144a, 144b during the removal of the crop from the carcass 108. The stop 145 ensures that the neck vertebrae are retained/confined in a horizontal sense within the breaker members 144a, 144b. When the breaker 15 140 has to be operated—whilst keeping the breaker at the same height—by shifting the curve track 142, the roll 143 is moved upwards as a result of which the gear wheels 147a, 147b will rotate towards one another at the top, so that the breaker edges 149a, 149b will be moved towards one another and the situation shown in the FIGS. 6B and 6D is reached, This is all elucidated on the basis of the FIGS. 7A–7F. In FIG. 7A the crop probe 114 is moved up again into the carcass 106, the lower end 116 being held at a level just above the breaking plane. In this way the neck vertebrae region is stabilized during breaking. The L-shaped supports 126a, 126b and the U-shaped shoulder support 132 in this case hold the carcass 108 in the correct position. As can be seen in FIG. 7A the breaker edges 149a, 149b of the breaker members 144a, 144b are at a distance d1 from one another. The neck 111 with the neck vertebrae 111a extends downward in an unhindered fashion between the breaker members 144a and 144b.

In FIG. 7A it can also be seen that the holder 141 for the breaker 140 is further provided with a roll 152 (not shown in FIGS. 4–6), which is arranged to follow a cam track or curve path 151. This cam track 151 is located below the cam track 142, so that these paths do not interfere with one another.

Prior to the situation shown in FIG. 7A and prior to crop removal, the U-shaped shoulder support 132 is, because of suitable design of the curve track 130, moved to abut the lower side of the shoulders of the wings 110, so that the shoulder regions/axillary regions of the wings 110 are, as it were, clamped between the surfaces 150a, 150b of the L-shaped axillary supports 126a, b and the surfaces 155a, 155b of the u-shaped shoulder support 132. The surfaces 155a, 155b are in this case convex, whereas the surfaces 155a, 155b are horizontally flat. The resultants G of the surfaces 155a and 155b, respectively are in this case located laterally outside the resultants F of the surfaces 150a and 150b, respectively. As can be seen in FIG. 7F the resultants F and G generate an upwardly inwardly rotating moment which is exerted on the wings 110, which moment counteracts a moment exerted by the upward movement of the crop probe 113.

Figure 7B:
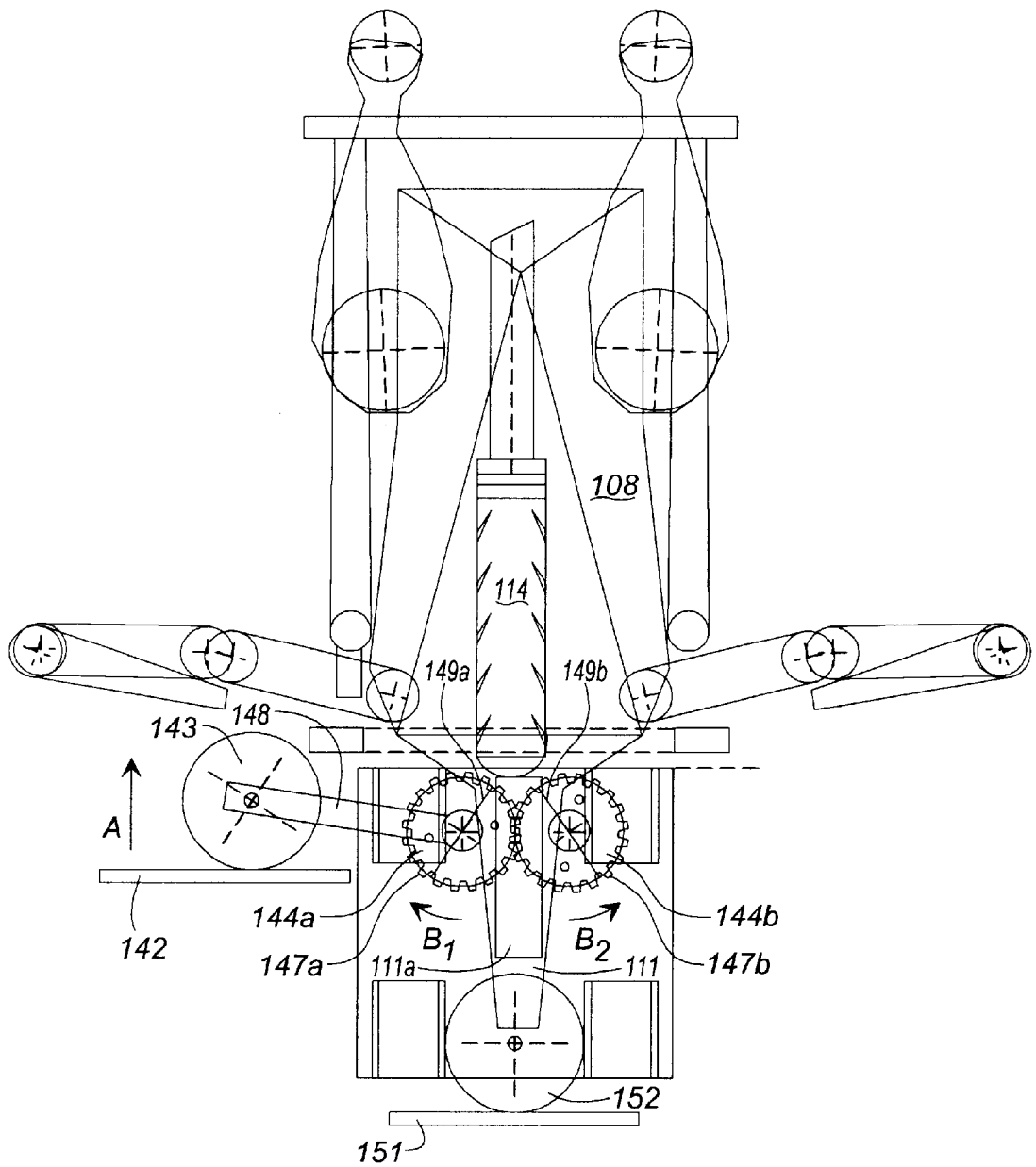
Figure 7C:
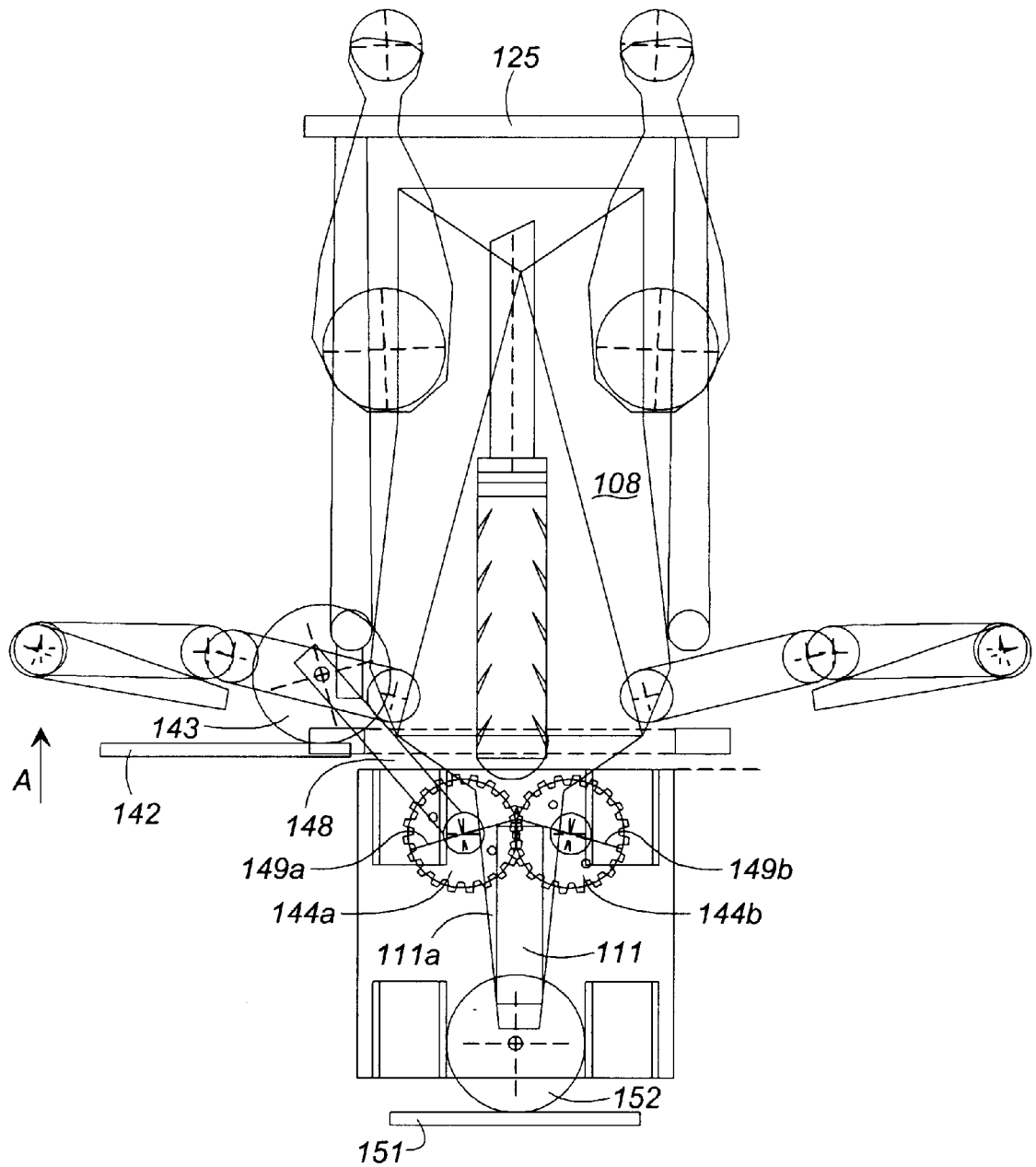
Figure 7D:
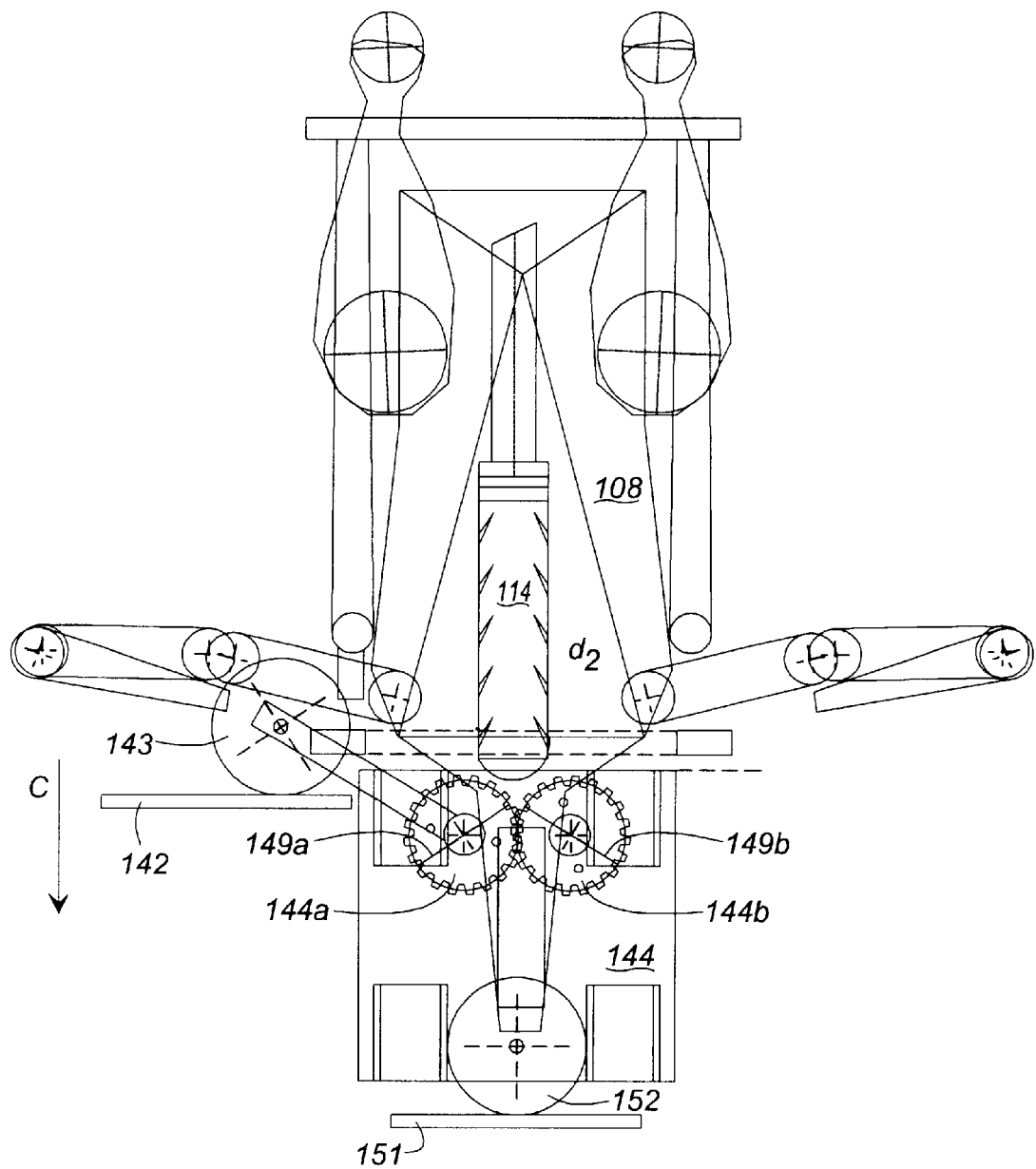
Figure 7E:
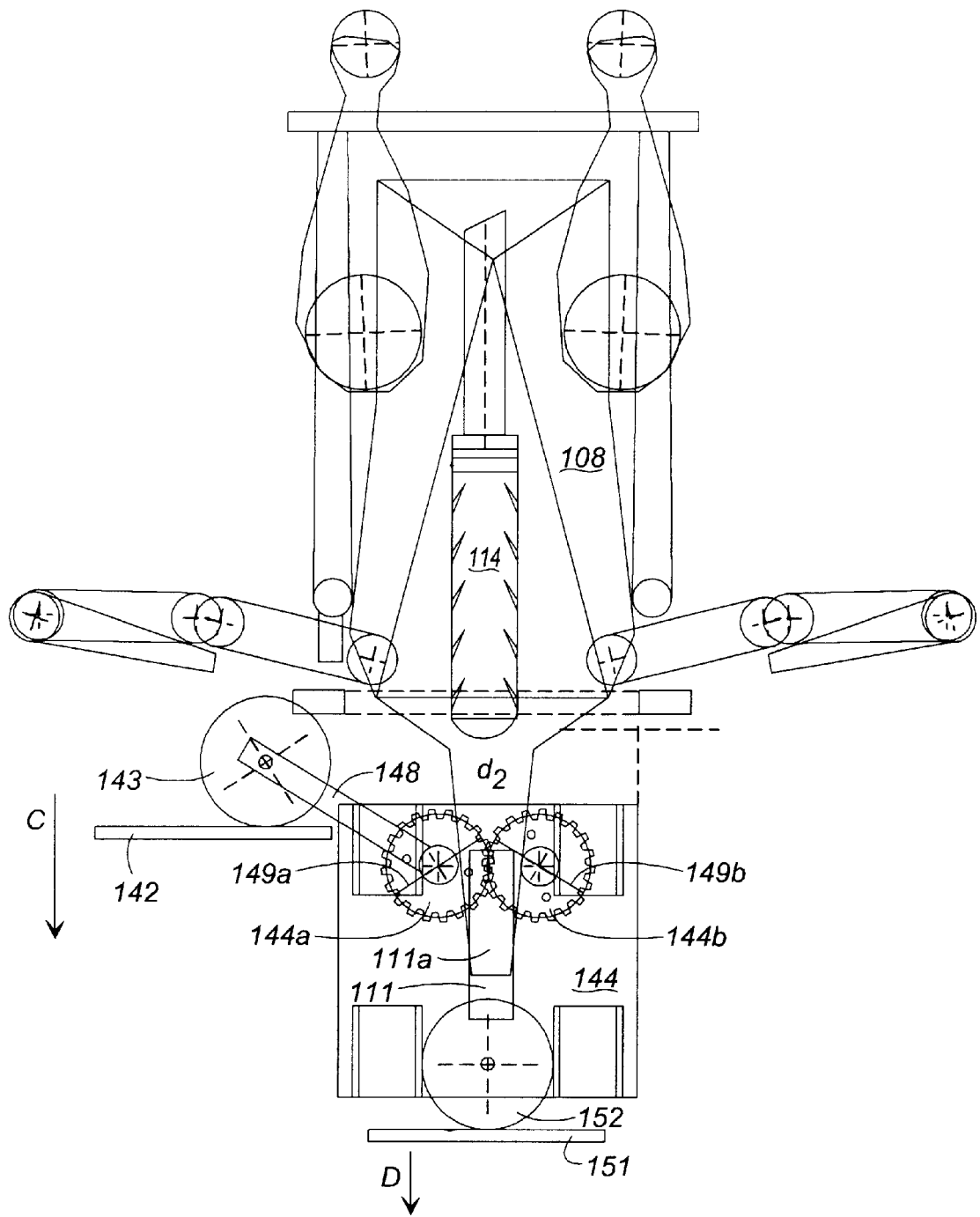
Figure 7F:
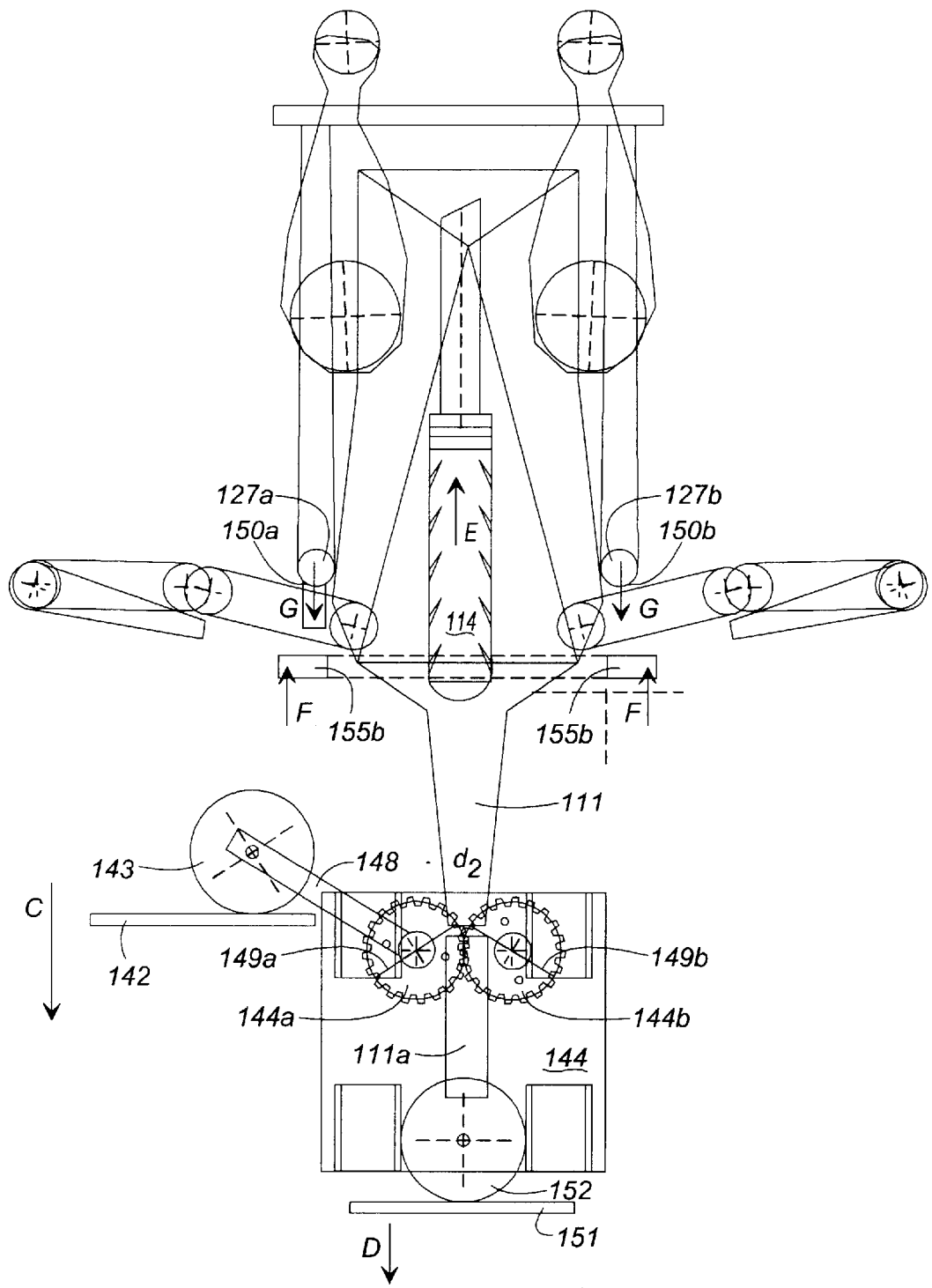

By of suitable design of the curve track 142, in FIG. 7B the roll 143 is moved upward in the direction A, whereby the gear wheel 147a is rotated to the right as seen in the drawing in the direction B1, so that through the interengagement of the teeth the gear wheel 147b is rotated to the left in the direction B2. Both the shafts 146a, 146b will in this case rotate at the top toward one another and hence the breakers 144a, 144b, too. This rotation takes place until both breaker edges 149a, 149b are brought to a distance of approximately 1,5 mm from one another, in the case of a chicken of full-grown proportions. Due to suitable design of the curve track 142 and the propelling speed of the unit 112 adapted thereto, the force with which the breaker edges 149a, 149b move toward one another will be large enough to loosen the neck vertebrae 111a from the rest of the skeleton of the carcass 108. Due to the circular path which the breaker edges 149a, 149b follow here, simultaneously a downward ejecting effect will be exerted on the neck vertebrae 111a, as is shown in FIG. 7C After the neck vertebrae 111a have been separated, a slightly downward course of the curve track 142 ensures that the roll 143 moves downwards in the direction C, to rotate the breaker members 144a, 144b back again somewhat, until between the breaker edges 149a, 149b a distance d2 of, in this example with a chicken, approximately half a centimeter has been reached. In that mutual distance the breaker 140 is suited for completely ejecting the broken-off neck vertebrae 111a out of the neck 111. For this purpose the curve track 142 as well as the curve path 151 has been given a downward course, to allow the rolls 143 and 152 to simultaneously move downward, the distance $d_2$ being retained. Hence the breaker edges 149a, 149b fulfil a stripping-off function, whereas the skin of the neck 111 remains substantially undamaged.

After the broken-off neck vertebra portion 111a has been thus downwardly ejected and collected is a collection tray, the crop probe 113 can be raised in the direction E, during which movement the cooperation between the axillary supports 127a, 127b and the shoulder supports 155a, 155b ensure that the wings 110 are not excessively loaded and their connection with the carcass remains intact.

Figure 8:
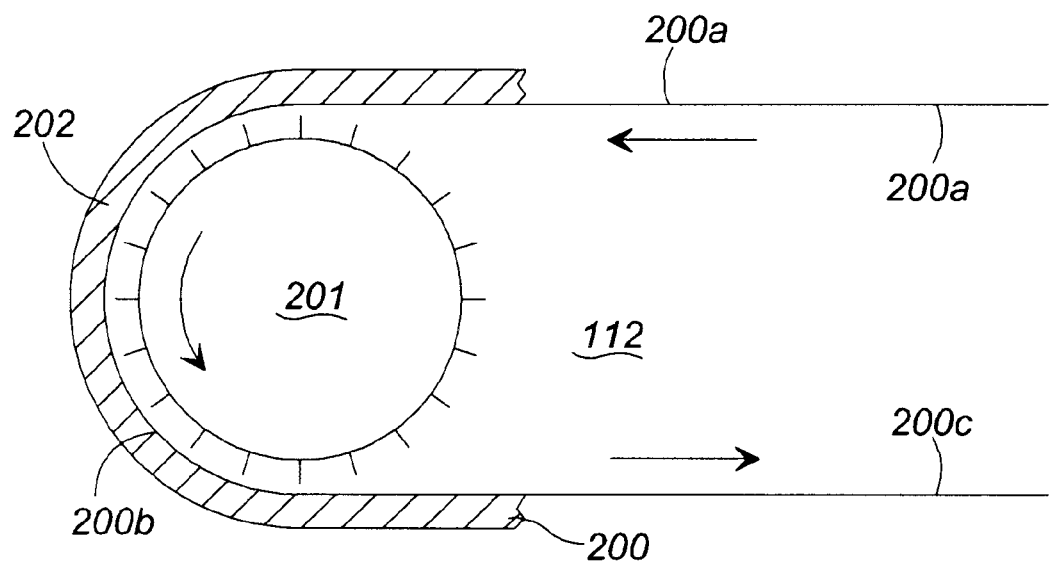
FIG. 8 shows a schematic reproduction of a carousel in which breakers are arranged.

In FIG. 8 an indication is given concerning the saving of space which is obtained with the breaker device according to the invention. The overhead conveyor 200 and the turret or carousel 201 are shown. The carousel 201 is provided with a circularly arranged series of units 112, as discussed above. The overhead conveyor 200 comprises an incoming section 200a, a section 200b circulating with it and an exit section 200c. A hatched area 202 is shown on the radial outer side of the path 200b. If no use were made of the invention, this hatched area 202 would have to be occupied by operating means, such as curve tracks, for the breakers. This area 102 and the direct surroundings takes up space and is a potential danger for bystanders.

While preferred embodiments of the invention are disclosed by the foregoing specification and drawings, variations and modifications thereof can be made without departing from the spirit and scope of the invention, as set forth in the following claims.

We claim:

1. Device for removing at least the crop of slaughtered poultry, comprising means for holding a carcass of the poultry, a crop probe assembly with a crop probe holder and an elongated crop probe, which is provided with crop engaging means in an end portion, such as a number of teeth/sprockets, means for moving the crop probe up and down between a non-active position to one or more active positions, means for turning the crop probe about its longitudinal axis, in which the crop probe is provided with a nose on the outer end of the end portion, and in which on the side of the holder means facing away from the crop probe the device is provided with a neck breaker, with neck breaking means and with means for activating the neck breaker and with means for moving the neck breaker toward the carcass and away from it, said means for moving the crop probe, the activating means and the means for moving the neck breaker being geared to one another such that during activation of the neck breaker the nose of the crop probe is held on a level which is situated just above the breaking plane of the neck of the carcass to be realized by the neck breaker.

2. Device according to claim 1, in which the moving means for the crop probe, the activating means for the neck breaker and the moving means for the neck breaker are geared to one another such that directly after breaking, the neck breaking means are moved away in distal direction from the carcass in a neck clamping position and the crop probe remains in position.

3. Method for removing at least the crop of slaughtered poultry and breaking the neck of the carcass, in which a crop probe attached to a crop probe holder and provided with an end portion having crop engaging means such as teeth is moved from above through the vent in a suspended carcass till the end portion of the crop probe has arrived at the crop, the crop probe is rotated a few times to loosen the crop, the crop probe is moved to the outside through the neck for discharging the loosened material, the crop probe is subsequently moved upwards till the nose-shaped end of the end portion is positioned just above the desired breaking plane of the neck, and subsequently the neck is broken with the aid of a neck breaker having neck breaking means.

4. Method according to claim 3, in which after breaking the neck the actual neck breaking means are moved downwards slightly in their active position to force the neck vertebrae downwards, whereas the crop probe is held at an unchanged level.

5. Method according to claim 4, wherein after breaking the neck the neck breaker is moved relatively downwards in a clamping condition to force the dislodged neck vertebrae out of the neck skin.

6. Method according to claim 3, in which after having been moved somewhat downwards the neck breaker is removed from the neck and the neck is constricted with the help of fixed guides for gradually ejecting the neck vertebrae from the neck skin during continuous transport of the carcass.

7. Method for removing at least the crop of slaughtered poultry and breaking the neck of the carcass, in which a crop probe attached to a crop probe holder and provided with an end portion having crop engaging teeth is moved from above through the vent in a suspended carcass till the end portion of the crop probe has arrived at the crop, liquid is sprayed into the bird through the crop probe, the crop probe is rotated to loosen the crop, the crop probe is moved to the outside through the neck for discharging the loosened material, in which the crop probe holder sucks away air from adjacent outside areas with organ remains when the crop probe holder is situated in the area of the lungs.

8. A method of removing the remaining crops from previously eviscerated birds moving in spaced series along a processing path including the steps of inserting an elongated probe into the vent of the bird, through the visceral cavity and through the neck, and rotating the probe as it moves through the bird, the improvement therein of moving liquid into the bird as the probe rotates in the bird, and of drawing fluid from the visceral cavity of the bird after the probe has passed beyond the visceral cavity and through the neck of the bird.

9. Method as described in claim 8 wherein the drawing of fluid comprises the step of sucking in air through a holder member for the probe.

10. Apparatus for removing the crop and other viscera from partially eviscerated birds suspended by their legs from bird support shackles of a conveyor system and moveable with said shackles in series along a poultry processing path comprising:

a support frame, a plurality of bird processing modules moveable in series about said support frame in timed sequence with the movement of the bird support shackles, said bird processing modules each including an elongated rotary probe for insertion downwardly into the visceral cavity of a bird and through the neck of the bird, and formed with a proximal end and a distal end, said probe having nozzles adapted to spray liquid therefrom, cam means mounted on said support frame for raising and lowering said modules in response to said modules moving about said support frame, wherein the nozzles are angled in the direction of rotation and are directed in a plane perpendicular to the probe.

11. Apparatus according to claim 10, wherein said modules each include a mandrel, the proximal ends of said probes being rotatably supported by said mandrel, said mandrels each having an external surface sized and shaped to approximately fit the interior size and shape of the visceral cavity of a bird, said mandrels each including a suction channel opening through its external shape.

12. Apparatus for removing the crop and other viscera from partially eviscerated birds suspended by their legs from bird support shackles of a conveyor system and moveable with said shackles in series along a poultry processing path comprising:

a support frame, a plurality of bird processing modules moveable in series about said support frame in timed sequence with the movement of the bird support shackles, said bird processing modules each including an elongated rotary probe for insertion downwardly into the visceral cavity of a bird and through the neck of the bird, and formed with a proximal end and a distal end, an annular liquid plenum formed about said proximal end, and radially extending nozzles in communication with said liquid plenum for spraying liquid outwardly of said probe, means for rotating said probe in response to the movement of said module about said support frame, cam means mounted on said support frame for raising and lowering said modules in response to said modules moving about said support frame, each of said probes including liquid conduit means for directing liquid from said probe, and each of said modules including supply means for supplying liquid under pressure to said liquid plenum, wherein preferably the nozzles are angled in the direction of rotation and preferably the nozzles are directed in a plane perpendicular to the probe.

13. Apparatus for removing the crop of a bird, including an elongated rotary probe having a longitudinal axis, a distal end, a proximal end, and an intermediate portion having teeth extending therefrom, an annular plenum formed about said proximal end, and circumferentially spaced nozzles extending outwardly from said plenum for directing liquid outwardly from said proximal end, said rotary probe configured for rotation about said longitudinal axis, said nozzles being angled in the direction of rotation and directed in a plane perpendicular to said rotary probe, wherein said rotary probe is adapted to be inserted downwardly into the visceral cavity of a bird, rotated within the visceral cavity, and then inserted through the neck of the bird.

14. A probe for removing the crop and other viscera from partially eviscerated birds, said probe comprising: an elongated body for rotation in a first direction about a longitudinal axis including a rounded distal end, a proximal end an intermediate portion, said intermediate portion extending between said distal and proximal ends, a series of teeth projecting from said intermediate portion, and said probe including liquid flow conduit means including an inlet for receiving liquid and nozzle means angled towards said direction of rotation for directing liquid outwardly from said probe and in the direction of rotation of said probe at circumferential intervals about said probe.

15. The probe of claim 14, wherein said nozzle means is positioned at said proximal end and comprises a plurality of nozzles arranged in circumferentially spaced relationship about said probe for directing streams of liquid outwardly and horizontally from said intervals about the probe.

16. The apparatus according to claim 15, further comprising means for sucking air from the vicinity of the crop probe assembly arranged at the lower portion of the crop probe holder and means for removing the sucked-in air.

17. Crop probe assembly according to claim 16, in which the suction means have at least one suction nozzle, which is spaced at a distance from the end portion which distance is larger than the distance between the end of the neck and the crop of the carcass to be processed.

\* \* \* \* \*